(12) United States Patent
Al Sayeed et al.

(10) Patent No.: US 11,824,581 B2
(45) Date of Patent: Nov. 21, 2023

(54) TURN-UP PROCEDURE FOR LOCAL AND REMOTE AMPLIFIERS IN AN OPTICAL SYSTEM

(71) Applicant: Ciena Corporation, Hanover, MD (US)

(72) Inventors: Choudhury A. Al Sayeed, Stittsville (CA); Song Cao, Kanata (CA); Na Young Kim, Carleton Place (CA)

(73) Assignee: Ciena Corporation, Hanover, MD (US)

( * ) Notice: Subject to any disclaimer, the term of this patent is extended or adjusted under 35 U.S.C. 154(b) by 177 days.

(21) Appl. No.: 17/399,295

(22) Filed: Aug. 11, 2021

(65) Prior Publication Data
US 2023/0053180 A1   Feb. 16, 2023

(51) Int. Cl.
*H04B 10/29* (2013.01)
*H04B 10/03* (2013.01)
*H04B 10/25* (2013.01)
*H01S 3/067* (2006.01)
*H01S 3/23* (2006.01)
*H01S 3/30* (2006.01)
*H04B 10/291* (2013.01)
(Continued)

(52) U.S. Cl.
CPC ......... *H04B 10/03* (2013.01); *H01S 3/06716* (2013.01); *H01S 3/2316* (2013.01); *H01S 3/30* (2013.01); *H04B 10/25* (2013.01); *H04B 10/07* (2013.01); *H04B 10/071* (2013.01); *H04B 10/29* (2013.01); *H04B 10/2916* (2013.01); *H04B 10/2935* (2013.01)

(58) Field of Classification Search
CPC ........ H04B 10/03; H04B 10/25; H04B 10/07; H04B 10/071; H04B 10/29; H04B 10/2916; H04B 10/2935; H04B 10/293; H01S 3/06716; H01S 3/2316; H01S 3/30; H01S 3/06758; H01S 3/302
USPC ....................................... 398/1–38, 173–181
See application file for complete search history.

(56) References Cited

U.S. PATENT DOCUMENTS

| | | | |
|---|---|---|---|
| 5,892,615 | A | 4/1999 | Grubb et al. |
| 5,905,745 | A | 5/1999 | Grubb et al. |

(Continued)

FOREIGN PATENT DOCUMENTS

| | | | |
|---|---|---|---|
| CA | 2 189 568 | C | 10/2002 |
| CA | 3 089 139 | A1 | 11/2019 |

(Continued)

*Primary Examiner* — Dibson J Sanchez
(74) *Attorney, Agent, or Firm* — Baratta Law PLLC; Lawrence A. Baratta, Jr.

(57) ABSTRACT

Systems and methods are provided for creating a sequence of turn-up processes for amplifiers. A method, according to one implementation, includes determining when a fiber span is initially installed in an optical line system or when an Optical Line Failure (OLF) in the fiber span has recovered. The optical line system includes a first set of amplifiers deployed at an upstream node and a second set of amplifiers deployed at a downstream node, the upstream node connected to the downstream node via the fiber span. In response to determining that the fiber span is initially installed in the optical line system or that an ORL in the fiber span has recovered, the method also includes sending a flag from the upstream node to the downstream node to allow the first set of amplifiers to perform a first turn-up process before the second set of amplifiers perform a second turn-up process.

20 Claims, 18 Drawing Sheets

(51) Int. Cl.
*H04B 10/071* (2013.01)
*H04B 10/07* (2013.01)
*H04B 10/293* (2013.01)

(56) References Cited

U.S. PATENT DOCUMENTS

| | | | |
|---|---|---|---|
| 6,115,403 A | 7/2000 | Brenner et al. | |
| 6,275,632 B1 | 8/2001 | Waarts et al. | |
| 6,404,948 B2 | 6/2002 | Alexander et al. | |
| 6,407,863 B1 | 6/2002 | Archambault et al. | |
| 6,459,516 B1 | 10/2002 | Mizrahi et al. | |
| 6,466,362 B1 * | 10/2002 | Friedrich | H04B 10/2912 359/341.1 |
| 6,504,630 B1 * | 1/2003 | Czarnocha | H04B 10/0771 398/20 |
| 6,614,567 B1 * | 9/2003 | Al-Salameh | H04J 14/02 398/79 |
| 6,614,959 B1 | 9/2003 | Mizrahi et al. | |
| 6,795,607 B1 | 9/2004 | Archambault et al. | |
| 7,231,107 B1 | 6/2007 | Zhong et al. | |
| 7,254,327 B1 | 8/2007 | Zhong et al. | |
| 7,693,357 B2 | 4/2010 | Marrakchi El Fellah et al. | |
| 7,809,272 B2 | 10/2010 | Zhong et al. | |
| 7,962,049 B2 | 6/2011 | Mateosky et al. | |
| 8,364,036 B2 | 1/2013 | Boertjes et al. | |
| 8,457,497 B2 | 6/2013 | Zhong et al. | |
| 8,467,688 B2 | 6/2013 | Archambault et al. | |
| 8,509,621 B2 | 8/2013 | Boertjes et al. | |
| 8,625,994 B2 | 1/2014 | Archambault et al. | |
| 8,774,632 B2 | 7/2014 | Archambault | |
| 8,817,245 B2 | 8/2014 | Archambault et al. | |
| 9,060,215 B2 | 6/2015 | Miedema | |
| 9,140,624 B2 | 9/2015 | Bao et al. | |
| 9,419,708 B2 | 8/2016 | Rad et al. | |
| 9,455,546 B2 * | 9/2016 | Griseri | H04B 10/2916 |
| 9,680,569 B2 | 6/2017 | Archambault et al. | |
| 9,793,986 B2 | 10/2017 | Archambault et al. | |
| 9,806,803 B2 | 10/2017 | Bownass et al. | |
| 9,882,634 B1 | 1/2018 | Al Sayeed et al. | |
| 9,973,295 B2 | 5/2018 | Al Sayeed et al. | |
| 10,063,313 B1 | 8/2018 | Al Sayeed et al. | |
| 10,237,011 B2 | 3/2019 | Al Sayeed et al. | |
| 10,237,633 B2 | 3/2019 | Chedore et al. | |
| 10,250,326 B2 | 4/2019 | Bao et al. | |
| 10,263,386 B1 | 4/2019 | Sridhar et al. | |
| 10,277,311 B2 | 4/2019 | Archambault et al. | |
| 10,277,352 B2 | 4/2019 | Chedore et al. | |
| 10,374,704 B2 | 8/2019 | Archambault et al. | |
| 10,439,709 B1 | 10/2019 | Al Sayeed | |
| 10,454,609 B2 | 10/2019 | Chedore et al. | |
| 10,536,235 B2 | 1/2020 | Al Sayeed et al. | |
| 10,541,748 B1 | 1/2020 | Chedore | |
| 10,547,404 B1 * | 1/2020 | Al Sayeed | H04B 10/0777 |
| 10,630,417 B1 | 4/2020 | Chedore et al. | |
| 10,680,737 B1 | 6/2020 | Al Sayeed et al. | |
| 10,680,739 B2 | 6/2020 | Swinkels et al. | |
| 10,735,837 B1 | 8/2020 | Al Sayeed et al. | |
| 10,746,602 B2 | 8/2020 | Pei et al. | |
| 2003/0231886 A1 * | 12/2003 | Young | H04J 14/0241 398/101 |
| 2004/0042063 A1 * | 3/2004 | Ohtani | H04B 10/2937 359/341.3 |
| 2004/0120706 A1 * | 6/2004 | Johnson | H04B 10/0771 398/10 |
| 2004/0201882 A1 * | 10/2004 | Kikuchi | H04B 10/2916 359/341.43 |
| 2004/0213567 A1 * | 10/2004 | Deguchi | H04B 10/03 398/32 |
| 2005/0110980 A1 * | 5/2005 | Maehara | H04B 10/071 356/73.1 |
| 2008/0232797 A1 * | 9/2008 | Muzicant | H04B 10/03 398/30 |
| 2009/0154941 A1 | 6/2009 | Mateosky et al. | |
| 2010/0150547 A1 * | 6/2010 | Xia | G01M 11/3145 398/79 |
| 2011/0141552 A1 * | 6/2011 | Ghera | H04B 10/2942 359/334 |
| 2011/0235164 A1 * | 9/2011 | Deore | H04J 14/0221 359/334 |
| 2013/0038865 A1 * | 2/2013 | McClean | G01M 11/3154 356/73.1 |
| 2014/0055777 A1 | 2/2014 | Archambault et al. | |
| 2014/0126897 A1 * | 5/2014 | Nakata | H04B 10/0771 398/2 |
| 2014/0348501 A1 | 11/2014 | Bao et al. | |
| 2018/0241473 A1 * | 8/2018 | Jing | H01S 3/10015 |
| 2019/0097719 A1 | 3/2019 | Chedore et al. | |
| 2019/0101447 A1 | 4/2019 | Pei et al. | |
| 2019/0238251 A1 | 8/2019 | Chedore et al. | |
| 2020/0007262 A1 | 1/2020 | Chedore et al. | |
| 2020/0228197 A1 | 7/2020 | Bhatnagar et al. | |
| 2020/0374001 A1 | 11/2020 | Chedore et al. | |
| 2022/0069934 A1 * | 3/2022 | Jiang | H04J 14/0213 |

FOREIGN PATENT DOCUMENTS

| | | |
|---|---|---|
| EP | 1 284 528 A2 | 2/2003 |
| EP | 2 564 532 B1 | 10/2017 |
| WO | 9419713 A1 | 9/1994 |

* cited by examiner

TURN-UP PROCEDURE FOR LOCAL AND REMOTE AMPLIFIERS IN AN OPTICAL SYSTEM

TECHNICAL FIELD

The present disclosure generally relates to optical networking systems and methods. More particularly, the present disclosure relates to turn-up procedures for powering up local amplifiers and remote amplifiers in an optical network.

BACKGROUND

During installation and maintenance of optical networks, it is important that installers and technicians take specific safety measures to prevent eye damage from high power lasers. In many situations, the optical networks are designed to reduce the power of optical amplifiers such that light emission from an unconnected optical line does not damage the eyes of the installers and technicians. One procedure is referred to as Automatic Power Reduction (APR) which includes automatically reducing the power of the optical amplifiers. The optical amplifiers may be instructed to go into the APR condition as certain times, such as when a fiber span is first installed, when a fiber cut of a fiber span is being repaired, or other situations when a fiber span may be disconnected from network elements at a node.

Conventional processes may be performed to turn down the amplifier power during installation or restoration of fiber spans. After installation or restoration, conventional processes normally include a manual process for turn-up of the amplifiers in an optical section. For example, when fibers are connected during a first time installation or while recovering from a fiber cut, a line-facing amplifier may stay at the APR condition when there is a large reflection. Normally, such a large reflection may be an indication of disconnected fibers, a loose connection at a faceplate or patch panel, or contamination on the fiber tips. If the reflection remains high, the amplifier is not able to turn-up. However, conventional systems are not configured to analyze other factors in an optical system that may cause the high reflections. Therefore, there is a need in the field of optical network to consider other sources of reflections to allow amplifiers to be turned up to a target power after initial installation and/or fiber cut restoration.

BRIEF SUMMARY

The present disclosure is directed to various systems and methods for managing a sequence of turn-up procedures to allow upstream amplifiers to turn up before downstream amplifiers. This may be done to prevent backward-directed Amplified Spontaneous Emission (ASE) from a downstream Raman amplifier to cause an upstream Erbium-Doped Fiber Amplifier (EDFA) to enter and/or stay in an Automatic Power Reduction (APR) condition.

A method, according to one implementation, may include a step of determining when a fiber span is initially installed in an optical line system or when an Optical Return Loss (ORL) in the fiber span has recovered. For example, the optical line system may include a first set of amplifiers deployed at an upstream node and a second set of amplifiers deployed at a downstream node, the upstream node being connected to the downstream node via the fiber span. In response to determining that the fiber span is initially installed in the optical line system or that an ORL in the fiber span has recovered, the method may also include a step of sending a flag from the upstream node to the downstream node to allow the first set of amplifiers to perform a first turn-up process before the second set of amplifiers perform a second turn-up process.

The systems and methods may also be defined whereby this first set of amplifiers includes at least an Erbium-Doped Fiber Amplifier (EDFA). For example, the first turn-up process is configured to move the EDFA from an Automatic Power Reduction (APR) condition to a target output power condition. Also, the second set of amplifiers may include at least a Raman amplifier, wherein, before receiving the flag, the Raman amplifier may be liable to counter-propagate Amplified Spontaneous Emission (ASE) to the upstream node, potentially causing the first set of amplifiers at the upstream node to go into an Automatic Power Reduction (APR) condition.

Furthermore, the flag described above may be a Forward Defect Indicator (FDI) configured to keep the second set of amplifiers from turning on. Also, after the first set of amplifiers perform the first turn-up process, the method may further include the step of clearing the flag to allow the second set of amplifiers to perform the second turn-up process. The step of clearing the flag may include a) using an amplifier card turn-up diagnostic point to confirm that the card is ready to carry traffic, and/or b) clearing a Loss of Signal (LOS) indication from an immediate downstream Express-In (EI) port of a Raman amplifier of the first set of amplifiers.

The systems and methods of the present disclosure may also be configured to include the step of performing an Automatic Laser Shut-Off (ALSO) process before sending the flag from the upstream node to the downstream node. For example, the ALSO process may be configured to shut off the lasers of the first set of amplifiers at the upstream node and the second set of amplifiers at the downstream node. The method may also include performing the first turn-up process to move at least one amplifier of the first set of amplifiers to a targeted power regardless of an Automatic Power Reduction (APR) condition or low Optical Return Loss (ORL) condition. The method may also include detecting when there is a fiber disconnection condition and then reducing power to reduce the risk of fiber connection damage or eye damage to a person near the first set of amplifiers.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
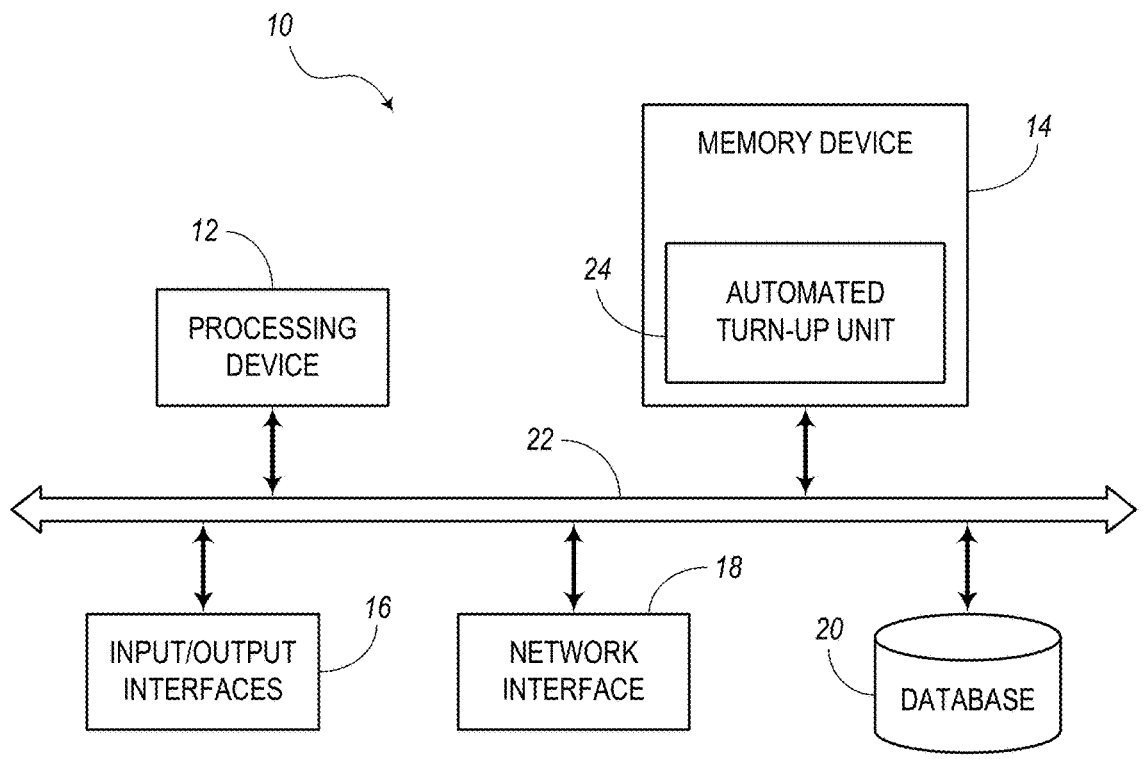
FIG. 1 is a block diagram illustrating a supervisory system for controlling the turn-up of amplifiers in an optical network, according to various embodiments of the present disclosure.

The present disclosure relates to systems and methods for enabling automatic turn-up procedures for local and remote optical amplifiers in an optical network, particular when a fiber span is first installed or when the fiber span is repaired from a fiber cut situation. Again, during installation and maintenance, power is reduced (e.g., using an Automatic Power Reduction (APR) technique) in the optical network to prevent damage to the eyes of technicians working around the optical equipment caused by high-power laser emissions. After initial installation or repairs, the optical amplifiers will be allowed to turn-up from the APR condition to a normal operation level. However, as mentioned above, if a high reflection is detected, the line-facing optical amplifier at a local node may stay at the APR condition.

Normally, these large reflections may be caused by optical fibers that are disconnected, loosely connected, or contaminated/dirty. If the reflection remains too high, the local amplifier might not get out of the APR condition and might be unable to turn-up until this reflection is reduced. However, it has been discovered, beyond what has normally been understood with respect to conventional turn-up strategies, that the high reflection may be caused by a counter-propagating Raman amplifier at a remote node.

One solution in this respect may include a first step of manually shutting down all the pumps of the remote-end Raman amplifier. This should normally unblock the local amplifier to allow turn-up at local-end. If it remains in the APR state, however, another step may include investigating a source of high backward reflection, such as loose connectors at the faceplate or at the patch-panels or contamination on the fiber tips. Once the APR condition is cleared, the technician may manually turn the remote Raman amplifier back on.

However, this manual process may be tedious and may create confusion in the field regarding alarm recovery processes. For example, when an APR is raised against an EDFA output port, the recommended clearing procedure is to clean-up the fiber at faceplate and patch-panels, which is the typical source of back-reflection. Again, it is not obvious, based on conventional solutions, that backward-directed Amplified Spontaneous Emission (ASE) generated from the Raman amplifier at a remote end can also be responsible for moving the local amplifier to the APR state. Thus, this remote Raman amplifier may require attention before triggering the regular fiber cleaning process.

Thus, the embodiments of the present disclosure focus on the automatic recovery of a fiber span during initial installation or following a fiber-cut recovery, particularly in a Raman-amplified fiber span. There are certain cases wherein, if the counter-propagating Raman amplifier recovers first before the local line-facing amplifier, then the backward-ASE generated by the Raman amplifier becomes too high to force the amplifier into the APR state and keeps it in this state. As a result, the fiber-span fails to recover successfully to carry traffic. This issue may be applicable for any Raman-amplified span but may be more pronounced for certain fiber types (e.g., Non-zero Dispersion-Shifted Fiber (NDSF), or the like) at high Raman gain, or if the span loss is reduced over time due to the release of a previously existing pinch. The issue may also be applicable in C+L configurations, where one band can see more backward-propagated ASE then the other band and may prevent the turn-up of both the C-band and L-band or the turn-up of individual band-specific amplifiers.

Therefore, the present disclosure provides automatic processes for turning up the optical amplifiers in an optical network. One implementation may include a turn-up sequence between the local-end optical amplifier (e.g., an Erbium-Doped Fiber Amplifier (EDFA) or the like) and the far-end optical amplifier (e.g., Raman amplifier or the like) for a given fiber-span. In this particular sequence of the present disclosure, the local-end amplifier should be turned on first before the far-end Raman amplifier. According to some implementations, the local amplifier can turn on while ignoring the backward-ASE, knowing that the backward-ASE is generated by the downstream Raman amplifier. These two different approaches allow a fiber span to recover automatically following a fiber-cut installation or a power-cycle of cards or nodes of the fiber-span.

The present disclosure maintains APR safety—because it only removes fake reflected power contributed by Raman ASE. If a real fiber fault occurs, the proposed approach still allows APR to function normally, this is a major difference than alternative approaches which more or less affect the APR safety feature.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a supervisory system 10 for controlling the turn-up of amplifiers in an optical network. In the illustrated embodiment, the supervisory system 10 may be a digital computing device that generally includes a processing device 12, a memory device 14, Input/Output (I/O) interfaces 16, a network interface 18, and a database 20. It should be appreciated that FIG. 1 depicts the supervisory system 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the supervisory system 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the supervisory system 10 and may include, for example, an internal hard drive connected to the local interface 22 in the supervisory system 10. Additionally, in another embodiment, the data store may be located external to the supervisory system 10 and may include, for example, an external hard drive connected to the Input/Output (I/O) interfaces 16 (e.g., SCSI or USB connection). In a further embodiment, the data store may be connected to the supervisory system 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 18 may be used to enable the supervisory system 10 to communicate over a network, optical network, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network.

In addition, the supervisory system 10 includes an automated turn-up unit 24. The automated turn-up unit 24 may be configured in software and/or firmware and stored in the memory device 14. In other embodiments, the automated turn-up unit 24 may be configured in hardware and incorporated in the processing device 12. In still other embodiments, the automated turn-up unit 24 may be implemented in any suitable combination of hardware, software, firmware, middleware, etc., in the supervisory system 10 and enables the processing device 12 to perform various steps or methods for automatically turning up amplifiers in an optical network or a section or optical line system of an optical network. Particularly, the automated turn-up unit 24 allows the processing device 12 to create a sequence where a local amplifier (e.g., EDFA) is configured to turn-up before a remote amplifier (e.g., Raman amplifier) is able to turn up.

Figure 2:
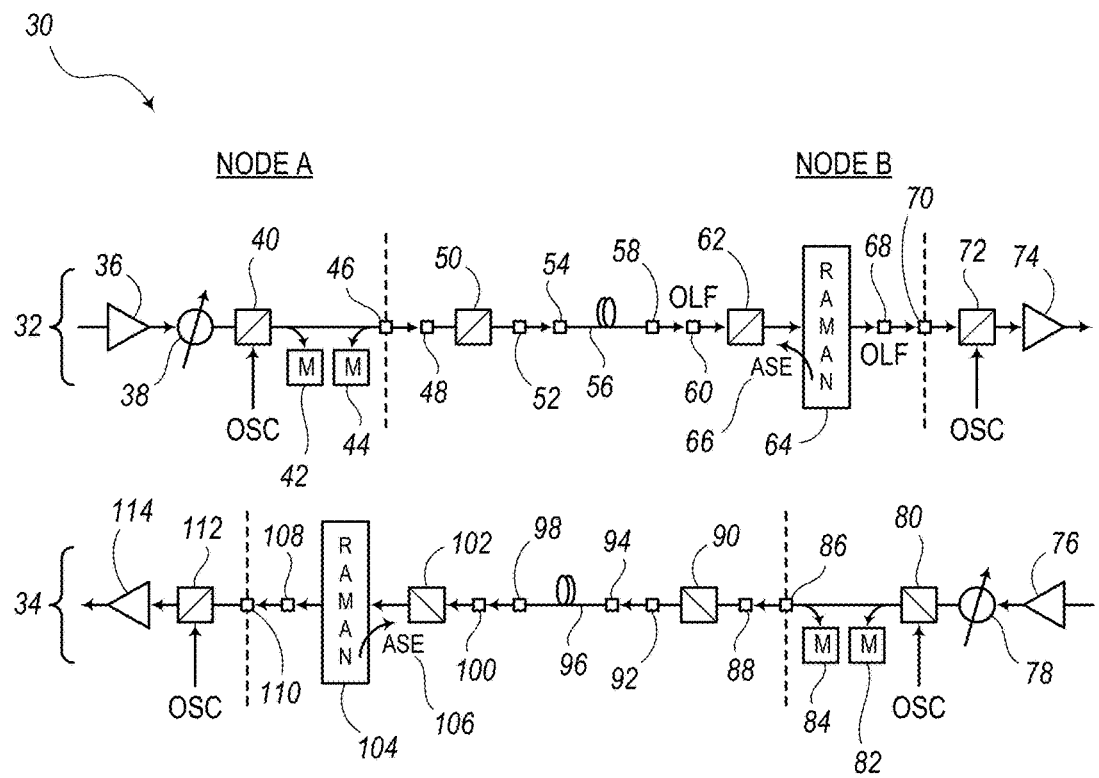
FIG. 2 is a schematic diagram illustrating an optical section between a first node and a second node, according to various embodiments.

FIG. 2 is a schematic diagram illustrating an optical section 30 between a first node (e.g., Node A or local node) and a second node (e.g., Node B or remote node). The optical section 30 includes a first set of components 32 for propagation of optical signals in a first direction (e.g., a west-to-east direction or the direction from Node A to Node B) and a second set of components 34 for propagation of optical signals in a second (opposite) direction (e.g., an east-to-west direction or the direction from Node B to Node A). This diagram may be used as a reference to show the problem of backward ASE from a far-end amplifier preventing a local amplifier from turning up.

The components 32 include Node A elements, which may comprise a local amplifier 36 (e.g., EDFA), a local Variable Optical Attenuator (VOA) 38, an Optical Supervisory Channel (OSC) port 40 (e.g., connected to the supervisory system 10 of FIG. 1), a forward power monitor 42, a back-reflection monitor 44, a faceplate port 46, an input telemetry port 48, a telemetry device 50, and an output telemetry port 52. The components 32 for west-to-east propagation further include an input span port 54, a fiber span 56, and an output span port 58. In addition, the components 32 also include Node B elements, which may comprise an input Optical Line Failure (OLF) monitor device 60, a telemetry device 62, a Raman amplifier 64 that may provide a backward ASE 66, an output OLF monitor device 68, a faceplate 70, an OSC port 72, and a booster amplifier 74 (e.g., EDFA).

Similarly, in the opposite direction, optical signals may be carried from Node B to Node A. The elements 34 used for propagating and monitoring signals in the east-west direction may include Node B elements, which may comprise a local amplifier 76 (e.g., EDFA), a local VOA 78, an OSC port 80 (e.g., connected to the supervisory system 10 of FIG. 1), a forward power monitor 82, a back-reflection monitor 84, a faceplate port 86, an input telemetry port 88, a telemetry device 90, and an output telemetry port 92. The components 34 for east-to-west propagation further include an input span port 94, a fiber span 96, and an output span port 98. In addition, the components 34 also include Node A elements, which may comprise an input OLF monitor device 100, a telemetry device 102, a Raman amplifier 104 that may provide a backward ASE 106, an output OLF monitor device 108, a faceplate 110, an OSC port 112, and a booster amplifier 114 (e.g., EDFA). It may be noted that Node A and Node B may include additional elements 32 for carrying and monitoring optical signals in either or both directions.

There are certain cases where the backward ASE 66 generated from the far-end counter-propagating Raman amplifier 64 is high enough that it forces the local-end amplifier 36 to detect high back-reflection (e.g., by back-reflection monitor 44) at turn up state, which, in turn, forces the amplifier 36 to erroneously move into APR state instead of turning up to a normal state to achieve its target gain or power. Similarly, the backward ASE 106 generated from the near-end counter-propagating Raman amplifier 104 may also be high enough to force the amplifier 76 to move into the APR state instead of turning up to the target level.

As part of its turn up sequence, the supervisory system 10 may check if there is a low Optical Return Loss (ORL), which is equal to the transmit power detected by the forward power monitor 42 divided by the back-reflected power detected by the back-reflection monitor 44. In a sense, this is comparable to a signal-to-noise ratio value, where the higher the value, the less noise or reflection. The supervisory system 10 detects the ORL present at the faceplate port 46 to determine if the power level is below a predetermined level for laser eye safety. If a low ORL is detected, the amplifier 36 keeps its total power at a reduced power level (or APR) to comply with laser safety and to avoid potential fiber/connector damage.

Such high backward ASE cases could arise when there is high Raman gain in the fiber span 56 the Raman amplifier 64. Also, fiber type may play a role as well. Some fiber types (e.g., NDSF) can be more exposed than others. High Raman gain can be set by the user (e.g., operator of the supervisory system 10) or by automatic applications (e.g., automated turn-up unit 24). The fiber span loss can reduce over time if a previously existing pinch is fixed, making the available Raman gain higher for the fiber span 56. At C-band only configurations, L-band only configurations, or C+L band configurations, one band can see more backward ASE then the other band, which may prevent the turn-up of band-specific amplifiers. Also, the problem may be more precisely exposed at C+L configurations, where Raman pump overlaps are allowed to achieve higher Raman gain at certain fiber types. However, this also creates unusually high ASE peaks at L-band, preventing the L-band amp turn-up. In such an example, a C-band amplifier can turn up to normal state, but the L-band forces itself to APR. The presence of reflection at the far-end Raman 64 express-out port 68 may also play a role to emphasize the backward-ASE level. Higher reflection at Raman express-out 68 may increase backward-ASE level at the far-end, and hence, expose the amplifier 36 to erroneous APR.

In this first implementation, the following is an example of a sequence of events that may be performed:

1. Node A is power-cycled: a) shuts downs amplifier 36, OSC 40, and telemetry 50, b) triggers Automatic Laser Shut-Off (ALSO) and Optical Line Failure (OLF) at the far end (Node B);
2. Node B sends a Reverse Defect Indicator (RDI) back to Node A;
3. Node A recovers from power-cycle; OSC 40 and telemetry 50 comes up;
4. Node A raises Automatic Shutoff (AS) flag for amplifier 36;
5. Node B runs Optical Time-Domain Reflectometry (OTDR) go/no-go traces (Long, Office, Short); run OTDR traces on dark fiber; ALSO condition is not lifted;
6. Once OTDR traces complete: ALSO is lifted, OLF and AS are cleared (e.g., Node B clears RDI);
7. If OTDR trace=go (e.g., Raman amplifier 64 is ready), then the Raman amplifier 64 at Node B turns on;
8. Node A receives RDI clearance from Node B; Node A amplifier 36 tries to turn on but sees high back-reflection detected at output port (coming from far-end Raman 64); Node A amp goes to APR;
9. If OTDR trace=no-go, then no issues, far-end Raman 64 remains OFF and Node A amplifier 36 can turn on.

Figure 3A:
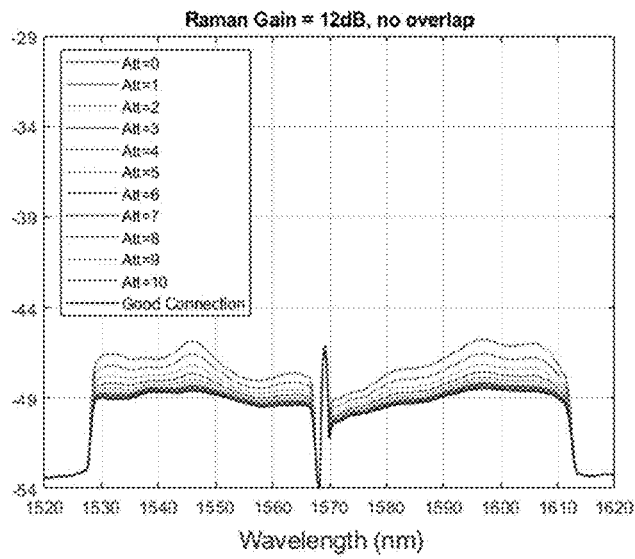
FIGS. 3A-3C show backward ASE spectrum with different reflection, gain, and overlap, according to various embodiments.
Figure 3B:
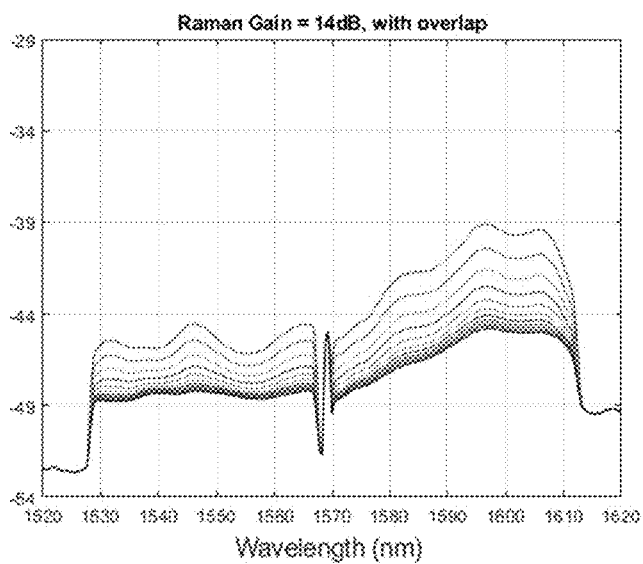
Figure 3C:
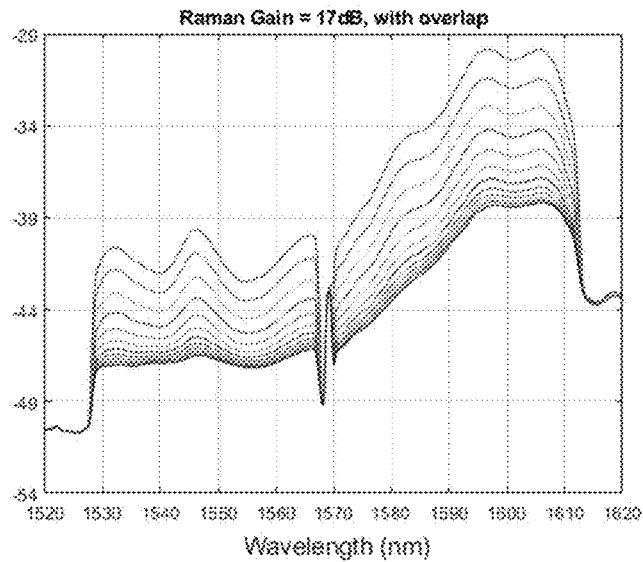

FIGS. 3A-3C show backward ASE spectrum with different reflection, gain, and overlap. Detail simulation results are added at the 2nd section of the package. Good Connection: Raman amplifier 64 Express Out (EO) at port 68 is connected to next amplifier (e.g., EDFA) input 72.

Figure 4A:
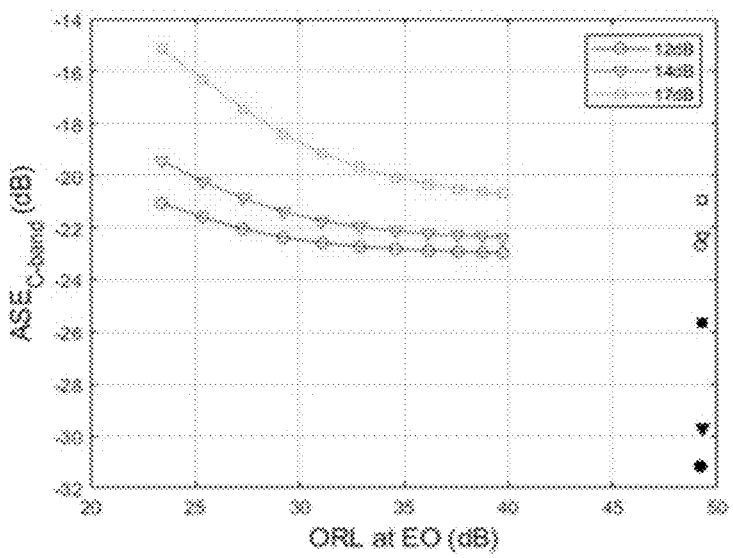
FIGS. 4A-4C show integrated backward ASE power at C-band and L-band in a C+L system, according to various embodiments.
Figure 4B:
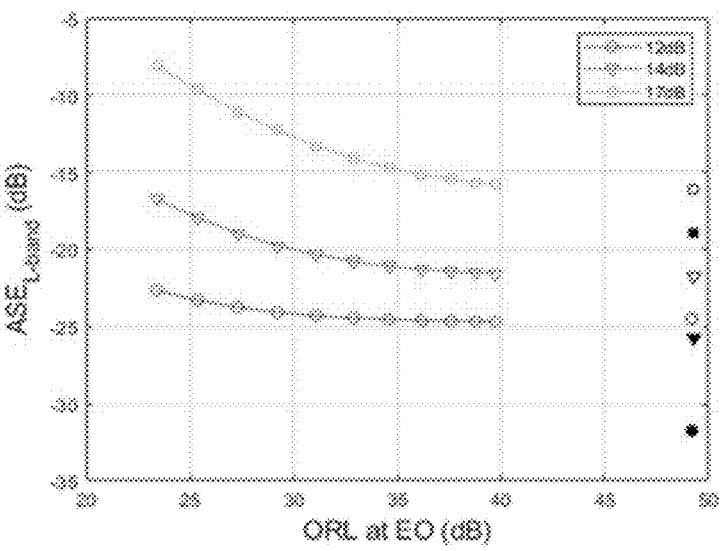
Figure 4C:
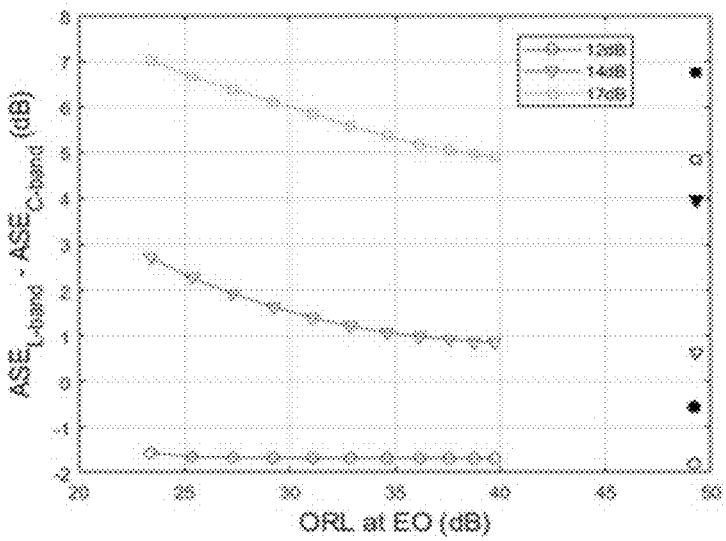

FIGS. 4A-4C show integrated backward ASE power at C-band and L-band in a C+L system. Detail simulation results are added at the 2nd section of the package. Offset was added after integrating Optical Spectrum Analyzer (OSA) spectrum to match the amplifier photodiodes.

Figure 5:
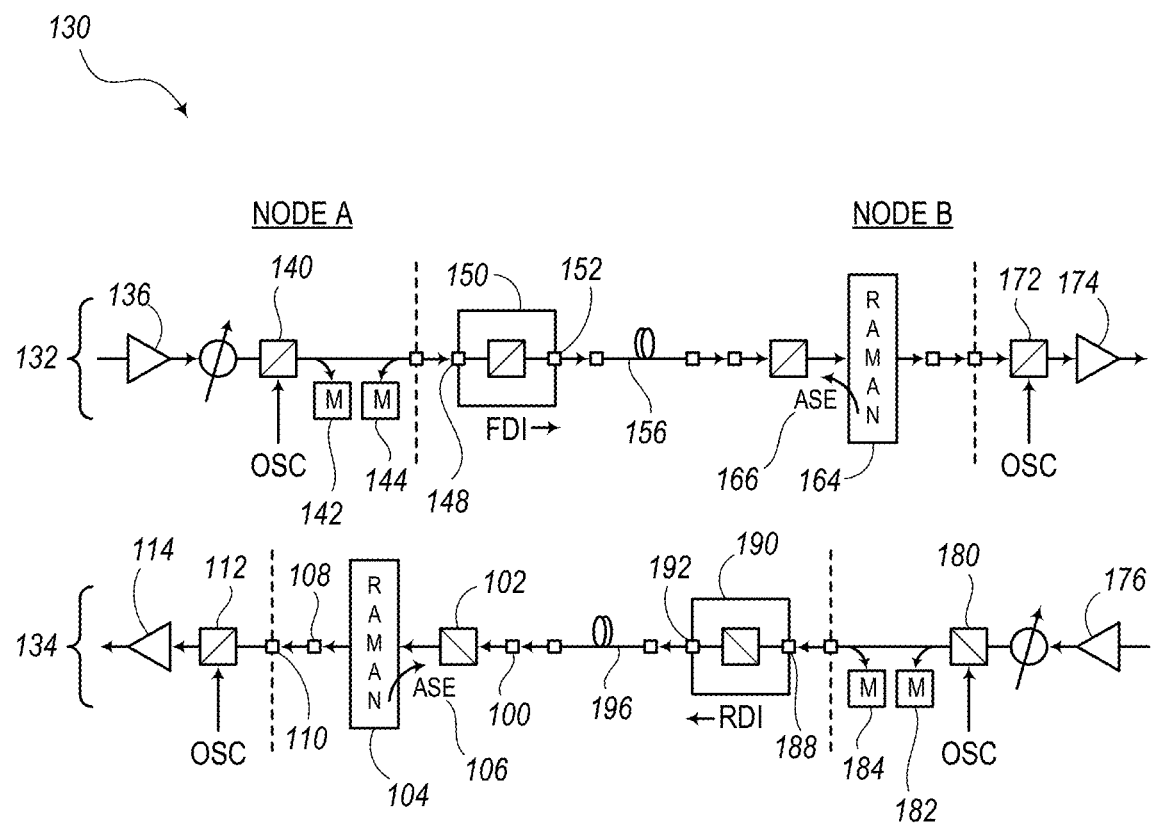
FIG. 5 is a schematic diagram illustrating another optical section between Node A and Node B, according to various embodiments.

FIG. 5 is a schematic diagram illustrating another optical section 130 between Node A (e.g., local node) and Node B (e.g., remote node). The optical section 130 includes a first set of components 132 for propagation of optical signals in a first direction (e.g., a west-to-east direction or the direction from Node A to Node B) and a second set of components 134 for propagation of optical signals in a second (opposite) direction (e.g., an east-to-west direction or the direction from Node B to Node A).

The optical section 130 is similar to the optical section 30 of FIG. 2. However, the input telemetry port 48, telemetry device 50, and output telemetry port 52 of the optical section 30 are replaced with a Raman amplifier 150 having an Express-In (EI) port 148 and a Line-Out (LO) port 152. Also, the input telemetry port 88, telemetry device 90, and output telemetry port 92 of the optical section 30 are replaced with a Raman amplifier 190 having an Express-In (EI) port 188 and a Line-Out (LO) port 192.

Figure 6:
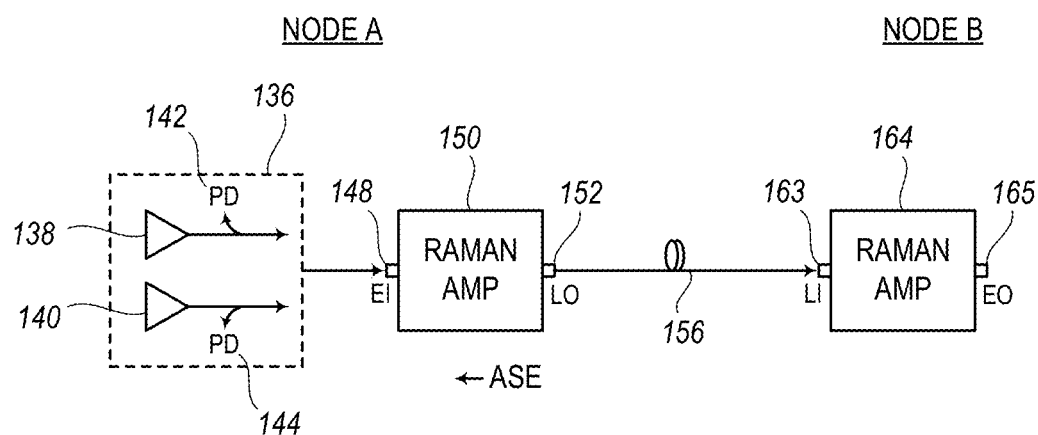
FIG. 6 is a schematic diagram illustrating an embodiment of a portion of the optical section of FIG. 5 for propagation from Node A to Node B, according to various embodiments.

FIG. 6 is a schematic diagram illustrating an embodiment of a portion of the optical section 130 of FIG. 5 for propagation from Node A to Node B. A gain block 136 of Node A includes a first amplifier 138 associated with a first band (e.g., C-band) and a second amplifier 140 (e.g., associated with a second band (e.g., L-band), such as in a C+L system. A first photodiode 142 is configured to monitor back reflection on the path of the first amplifier 138 and a second photodiode 144 is configured to monitor back reflection on the path of the second amplifier 140. The gain block 136 is connected to the Raman amplifier 150 at the Express-In (EI) port 148. The Line-Out (LO) port 152 of the Raman amplifier 150 is connected to the fiber span 156, which leads to Node B. At Node B, the Raman amplifier 164 includes a Line-In (LI) port 163 and an Express-Out (EO) port 165.

Before turning up to full target power, the supervisory system 10 is configured to reduce the output power of the gain block 136 to a power level that meets eye safety specifications (e.g., below eye damage limits) and/or fiber safety specifications (e.g., below specific fiber damage limits). For example, eye and fiber safety ranges may be less than or equal to about 10 dBm for C+L band systems (or less than or equal to about 7 dBm per band) and can be used as references for checking the status of back-reflection in the optical section 30.

$$\left( = \frac{Pout}{Preflected} \right)$$

If the measured Optical Return Loss (ORL) falls below a certain threshold (e.g., less than about 17 dB), then the gain block 136 stays at the reduced power level or Automatic Power Reduction (APR) level to maintain laser safety. Therefore, if the backward ASE from the Raman amplifier 164 for any given band (i.e., C-band or L-band) is greater than −10 dBm, then the band-specific amplifier 138, 140 fails to turn up. If there is a common tap for monitoring total power in a forward direction and back reflection tap for monitoring in the reverse direction at the output of a C+L coupler or gain block 136, then a high backward ASE in one band can prevent the turn up of both bands. It may be noted that ASE monitored in the reverse direction of traffic flow (i.e., in the counter-propagating direction) is referred as backward ASE and is monitored at the faceplate 46 or card faceplate at the output of the amplifier 36, 136 at Node A. On the other hand, the forward ASE is the ASE that is generated by the amplifier 36, 136 (e.g., EDFA), which is further amplified by Raman amplification, and is monitored at the Line-In (LI) port 163 of the remote Raman amplifier 164.

I. Method 1: Create a Turn-up Sequence for Local and Remote Amplifiers

According to preferred embodiments with respect to the present disclosure, a first method includes the creation of a turn-up sequence for turning up the local amplifier(s) and remote amplifier(s) in a particular order to avoid the problems that are common in the conventional systems. This method may be preferred since it does not place a constraint on the turn-up sequence of an amplifier gain block (e.g., gain block 136) and instead is coordinated by Raman amplifier cards, if present in a fiber span.

In some embodiments, this first method establishes a sequence of turn-up between the local-end amplifier 36, 136 (e.g., EDFA) and the far-end counter-propagating amplifier 64, 164 (e.g., Raman amplifier). For example, this method may be performed following a recovery from a fiber-cut or at a first time fiber connection. An objective in this method is to turn up the local-end amplifier 36, 136 first before the turn-up of the far-end counter-propagating amplifier 64, 164.

Specifically, the supervisory system 10 may be configured to determine when supervisory or telemetry communication is recovered between the local node (Node A) and the remote node (Node B). Following recovery of supervisory/control communication between the nodes, the supervisory system 10 is configured to send a Forward Defect Indicator (FDI) in the Optical Transport System (OTS) from the local node to the remote node. The FDI remains set until the local-end amplifier 36, 136 (e.g., booster amplifier) is able to be turned up.

The far-end Raman amplifier 64, 164 receives the FDI from Node A and uses this indication to keep the pumps of the Raman amplifier 64, 164 off. After the amplifier 36, 136 is turned up, the supervisory system 10 is configured to clear the FDI flag and send a signal on the OTS to communicate the clearing of the FDI flag to the remote node (Node B). In response, the Raman amplifier 64, 164 is configured to turn the pumps on. Thus, by utilizing the FDI flag, the supervisory system 10 is configured to control the turn-up sequence for the amplifiers such that the local amplifier 36, 136 (e.g., EDFA) is turned up before the remote amplifier 64, 164 (e.g., Raman). The supervisory system 10 may also be configured to perform Optical Time-Domain Reflectometry (OTDR) traces to check the fiber status to determine if the condition of the fiber span 56, 156 satisfies OTDR tests, such as when there is no high loss or reflection in the counter direction.

In some implementations, the local-end node can use an amplifier card turn-up diagnostic point to clear the FDI flag, which confirms the card is optically ready to carry traffic and/or can use a clearance of a Loss of Signal (LOS) from the immediate downstream card's Express-In (EI) port 148.

Use of LOS Flag at Express-In (EI) Port to generate FDI

Referring again to FIGS. 2 and 5, the supervisory system 10 of FIG. 1 can be configured to perform a procedure of using LOS at EI port 148 to generate FDI as a solution for creating the turn-up sequence. The supervisory system 10 may be configured to determine a LOS condition at the EI port 148 of the Raman amplifier 150 (FIG. 6) to generate the Forward Defect Indication (FDI), which is communicated to the Raman amplifier 164 (FIG. 6) of the OTS to keep the Raman amplifier 164 off until after the amplifiers 138, 140, 150 on the near end can be turned up first.

The following is an implementation of a sequence of events that may be controlled by the supervisory system 10 to perform this solution:

1. Node A is power-cycled: shuts downs amplifier 36, 136, OSC 40, and telemetry 50, 150; triggers Automatic Laser Shut-Off (ALSO) to shut off the emission of laser light for both directions at the transmit and receive nodes; shuts off light at the transmit side by putting the amplifier 36, 136 (e.g., booster amplifier) in an Automatic Shut-off (AS) state; sets Optical Line Failure (OLF) flag; and sends ALSO and OLF flags to the far end (Node B), which thereby causes an AS state of the amplifier 64, 164 at the remote end;
2. Node B sends a Reverse Defect Indicator (RDI) signal back to Node A;
3. Node A recovers from the power-cycle; supervisory system 10 causes OSC 40 and telemetry 50 to come back up;
4. Node A raises AS for amp; the EI port 148 of the Raman amplifier 150 at Node A sees LOS; the Raman amplifier 150 inserts FDI to shutdown far-end Raman amplifier 164;
5. Node B runs OTDR go/no-go traces (e.g., Long, Office, Short);
6. Once OTDR traces complete, ALSO and RDI flags are cleared; OLF and AS flags are cleared; Node B clears RDI;
7. Node B receives FDI from Node A. Similarly, Node A receives FDI from Node B (either over telemetry 50, 150 or OSC 40);
8. If OTDR trace=go, Raman amplifiers 150, 164 at both nodes remains at OFF state due to FDI received from the other node;
9. Node A receives ALSO and RDI clearance from Node B; Node A amplifier(s) 36, 136, 138, 140 turn on; other amplifiers (e.g., amplifier 74, booster amplifiers, EDFAs, remote amplifiers not including Raman amplifiers, etc.) turn on at Node B;
10. Node A EI port 148 of Raman amplifier 150 clears LOS flag that clears FDI; also, Node B LI port 163 of Raman amplifier 164 clears LOS flag that clears RDI flag;
11. Node B Raman amplifier 164 receives FDI clearance from Node A and turns on its pumps; also, Node A Raman amplifier 150 receives RDI clearance from Node B and turns on its pumps.

The advantage of using EI port 148 LOS flag on the Raman amplifier 150 card input port to generate FDI is that the Raman card can raise that locally without any dependency on the upstream EDFA or the local supervisory signals. This allows the Raman amplifier 150 to build a locally independent turn up sequence. Also, the Raman amplifier 150 can send the FDI flag via telemetry signaling to the far-end Raman card or via other means of supervisory communication that is typically originated from the Raman card at transmitter (Tx) end (Node A) and decoded by the Raman card on the receiver (Rx) end (Node B).

In addition, this method does not prevent any bootstrap operation on the far-end Raman amplifier card where only a certain set of pumps on the Raman amplifier can be turned on explicitly to amplify supervisory communication channels for initial link turn-up at commissioning time. The method can also be implemented where the local EDFA card sends an FDI flag to remote Raman amplifier to keep its pumps off while operating at normal operation until the local EDFA completes its turn-up sequence. If the local EDFA faces a low ORL on its turn-up and goes to APR state, this does not prevent the EDFA to clear the FDI flag as that low ORL cannot be caused due to backward ASE from far-end Raman.

II. Method 2: Allow EDFA to Confirm Fiber Connectivity and Ignore APR until Turn Up to Full Target Output Power Until the telemetry or supervisory communication is up, the ALSO condition will be set to TRUE that will keep the upstream booster at Automatic Shutoff (AS). Once the ALSO condition is cleared (e.g., when line fibers are connected) and downstream Raman OTDR traces are completed, the booster EDFA can turn up with the following sequence:
1. Bring EDFA to a reduced power level;
2. Check if downstream port LOS is cleared that confirms the fiber is connected to downstream;
3. If yes, then go to full target power while ignoring any APR or low ORL conditions;
4. Once at full target-power, re-evaluate APR condition.

This method eliminates any laser safety risk on EDFA turn-up. It also eliminates any sequence dependency on far-end node Raman card turn-up.

The prerequisite for this method may be that:
1. The automatic turn-up unit 24 or other suitable applications sets up the necessary link or backplane communications between the booster and the downstream Raman card at installation time and/or commissioning time;
2. The gain block 136 runs its own state machine without interruption from higher layer firmware applications. In this case, the gain block 136 may have to wait at the APR state if a low ORL is detected until logic (e.g., automatic turn-up unit 24 or other card software/firmware) detects the clearance of downstream card port LOS. The supervisory system 10 then sets an "ignore-APR at turn-up" flag on the gain block 136 so that it can turn up to full power before re-evaluating APR again.

The method also creates a constraint for a standalone EDFA to turn up, which may not have any link association with a Raman card. That is, any standalone EDFA gain-block first has to know if it has any downstream Raman amplifier connected. If yes, then it stays at the APR condition until an ignore-APR flag is received from the supervisory system 10.

III. Alternative Methods

Although the following methods have been considered, it has been determined that these methods may be inferior to the preferred Method I mentioned above.

One alternative method might include reducing the ORL threshold at turn-up, which means increasing the power limit for backward ASE that could prevent amp turn-up. However, the ambient back-reflection for amplifier in this case would be about 14 dB (open-connector). Considering the accuracies of monitoring by the photodiodes 142, 144 at different power levels, the ORL threshold cannot be practically lower than 17 dB in most typical implementations. Hence, lowering the ORL threshold would not be a viable option in this case.

A second alternative method might be a situation where low ORL can be ignored. This may be either take place at the gain block 136 turn-up sequence, as that becomes an issue for laser safety.

A third alternative method might be to bring the EDFA total power higher than its current APR threshold limit of 7 dBm or 10 dBm, but lower than its maximum output power limit to resolve this condition. However, on a gain-operated system, there is no guarantee that the amplifier will always be operating at its maximum operating power. This means that it cannot be assured that the EDFA output power can be made higher than the existing threshold. Also, increasing APR threshold substantially increases the risk of damaging fiber connectors.

A fourth alternative method might be to apply a debounce on ORL measurement. However, since both the gain block 136 output power and backward ASE are stable, the low ORL detection at turn-up is not a transient issue. Hence, applying a debounce on ORL measurements does not help in this condition A fifth alternative method might be to conduct a cold-restarting of the EDFA card multiple times or cleaning the fibers, which is a natural response to clear APR condition. However, this does not resolve the situation as the EDFA gain block will always end up in the same situation. Cold-restarting the far-end Raman, which will turn off Raman pumps, can resolve the condition, but this too is not a preferred option.

Figure 7:
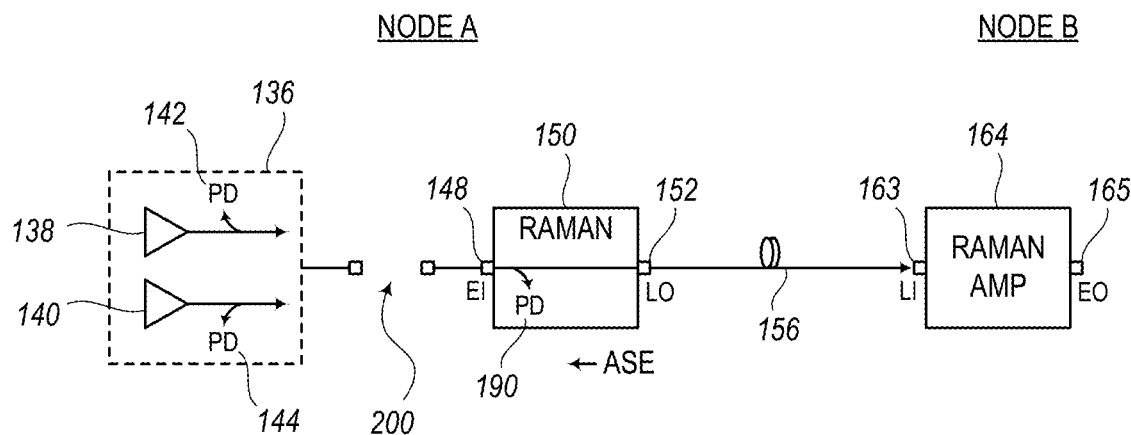
FIG. 7 is a schematic diagram illustrating the portion of the optical section as shown in FIG. 6 for propagation from Node A to Node B, according to various embodiments.

FIG. 7 is a schematic diagram illustrating the portion of the optical section 130 as shown in FIG. 6 for propagation from Node A to Node B. However, in this figure, it can be seen that there is a fiber cut 200 (or other type of open connection) between the gain block 136 (or line amplifier) and the Raman amplifier 150 at Node A. According to this simulation example, a 14 dB loss is detected as a result of the fiber cut 200. In some cases, there may be an overlapping of two pump groups in the Raman amplifiers 150, 164 in the C+L-band system.

A Pulse Width Modulation (PWM) may be introduced to prevent Four-Wave Mixing (FWM) of Raman pumps that may backscatter and degrade signals (e.g., Optical Signal-to-Noise Ratio (OSNR) signals) in the Raman amplifiers 150, 164 of the C+L-band system. For example, FWM is a phase-sensitive process affected by phase matching conditions and may be defined as an intermodulation phenomenon in nonlinear optics, whereby interactions between two or three wavelengths produce two or one new wavelengths. Due to PWM, only up to 50% maximum pump power can be available, which reduces the maximum available Raman gain. Overlapping gives about 3 dB to 4 dB of extension of the maximum Raman gain, which is higher than CW. In CW, there is a stronger pump-to-pump interaction between groups such that the first pump may hit the maximum power earlier.

In addition, overlapping may only be practical for fiber types including Non-zero Dispersion-Shifted Fiber (NDSF), NDSF Low Water Peak (LWP), EX2000, ULL, AllWave, and PSC. With overlapping, the max gain was found to be capped at 17 dB.

Referring again to FIG. 6, after a shelf power cycle, the line amplifier for boosting L-band power (e.g., amplifier 140) may be in the APR state. After turning off and turning on Raman pumps of Raman amplifier 164 in the downstream, the APR was cleared. The downstream Raman gain was determined in this case to be 17 dB for 19 dB span loss and the pumps were overlapped. After changing Raman gain to 13 dB, the problem was resolved. After power cycle of the shelf, the amplifier 140 for L-band boosting came to the normal state. With 13 dB gain, the pump overlap was not required.

Referring again to FIG. 7 with the fiber cut 200 (or other disconnection), the reflected backward Raman ASE from the Raman amplifier 164 the EI port 148 was not connected to the gain block 136 in this example, a photodiode 202 of the Raman amplifier 150 was able to detect power that was high enough to clear LOS. A new LOS threshold of −25 dBm was submitted.

Figure 8:
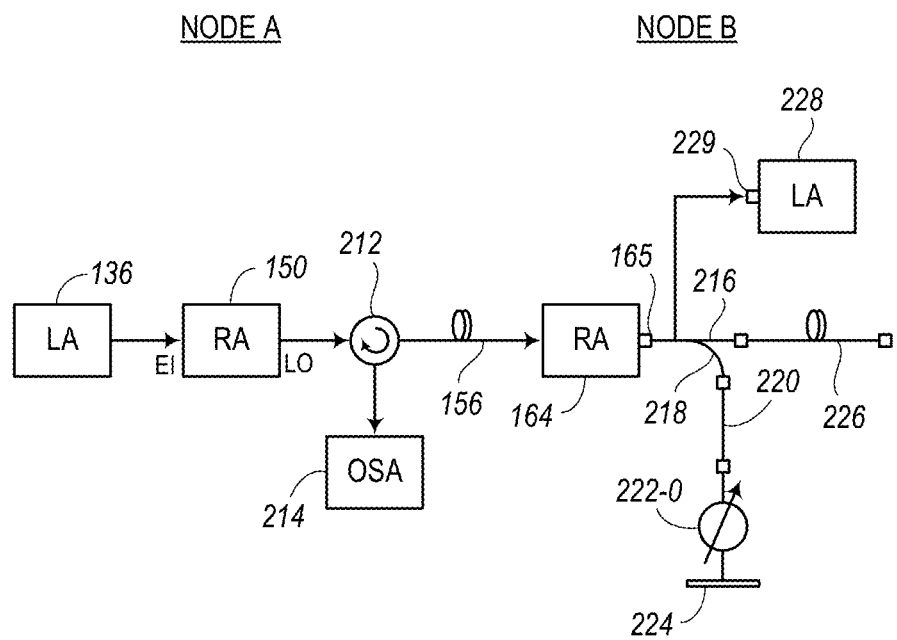
FIG. 8 is a schematic diagram illustrating an example of a test setup to quantify the backward Raman ASE, according to various embodiments.

FIG. 8 is a schematic diagram illustrating an example of a test setup 210 to quantify the backward Raman ASE. The gain block 136 (or line amplifier) is set to 14.7 dBm for C-band and 14.7 dBm for L-band. In this example, the fiber span 156 may be configured as NDSF with a length of 80 km and a span loss of 23 dB.

In addition, the test setup 210 in this embodiment includes a phase rotator 212 (or circulator) and an Optical Signal Analyzer (OSA) 214 on Node A. At Node B, the test setup 210 includes a 90 meter (90 m) fiber span 216 and a 10 m branch 218, connected to a 45 m branch 220, which in turn is connected to a Variable Optical Attenuator (VOA) 222-0 (e.g., Micro Electro-Mechanical System (MEMS) VOA), which in turn is connected to a retroflector 224. Also, the 90 m fiber span 216 is connected to an 80 km fiber span, which is opened (disconnected) at its far end. An amplifier 228 (e.g., line amplifier) is also connected to the EO port 165 of the Raman amplifier 164.

Figure 9:
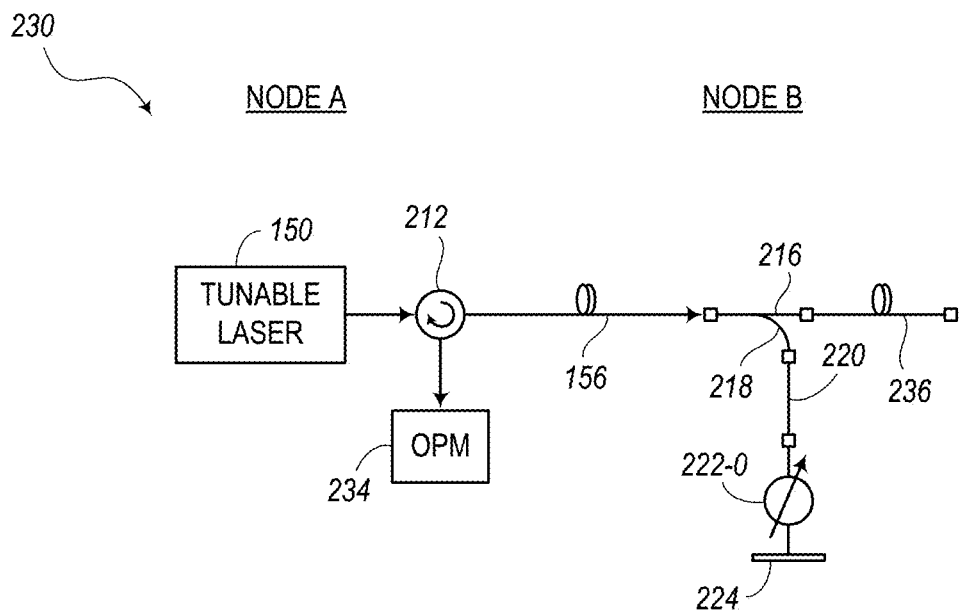
FIG. 9 is a schematic diagram illustrating another example of a test setup at Node B for testing wavelength dependence of reflections, according to various embodiments.
Figure 10:
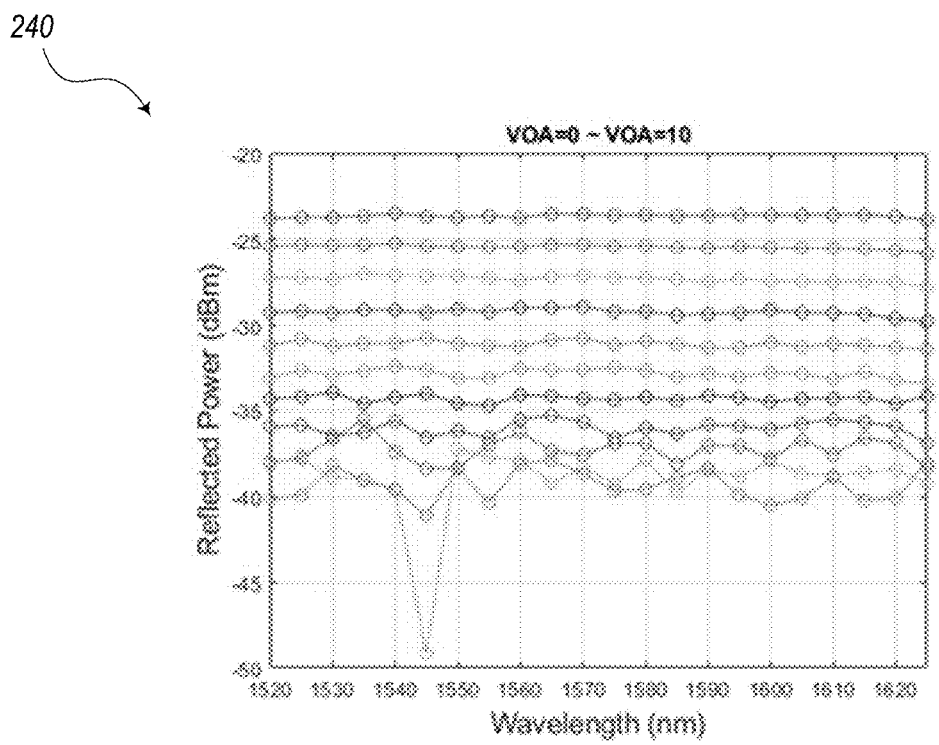
FIG. 10 shows a graph of the reflected power (in dBm) versus the wavelength (in nm) when the MEMS VOA is set at values of zero (0) to ten (10), i.e., VOA=0 . . . VOA=10, according to various embodiments.

FIG. 9 is a schematic diagram illustrating another example of a test setup 230 at Node B for testing wavelength dependence of reflections. At the LO port 152 of the Raman amplifier 150 (not shown in FIG. 9), a tunable laser 232 is connected to the phase rotator 212 (or circulator), which may be connected to the OSA 214 of an Optical Power Monitor (OPM) 234 (e.g., Optical Channel Monitor (OCM)). At Node B, 80 km fiber span 226 (FIG. 8) is replaced with a fiber spool 236 that has a bended open end on the far side. FIG. 10 shows a graph 240 of the reflected power (in dBm) versus the wavelength (in nm) when the MEMS VOA 222-0 is set at values of zero (0) to ten (10), i.e., VOA=0 . . . VOA=10. VOA and reflector are flat over the wavelengths.

Figure 11:
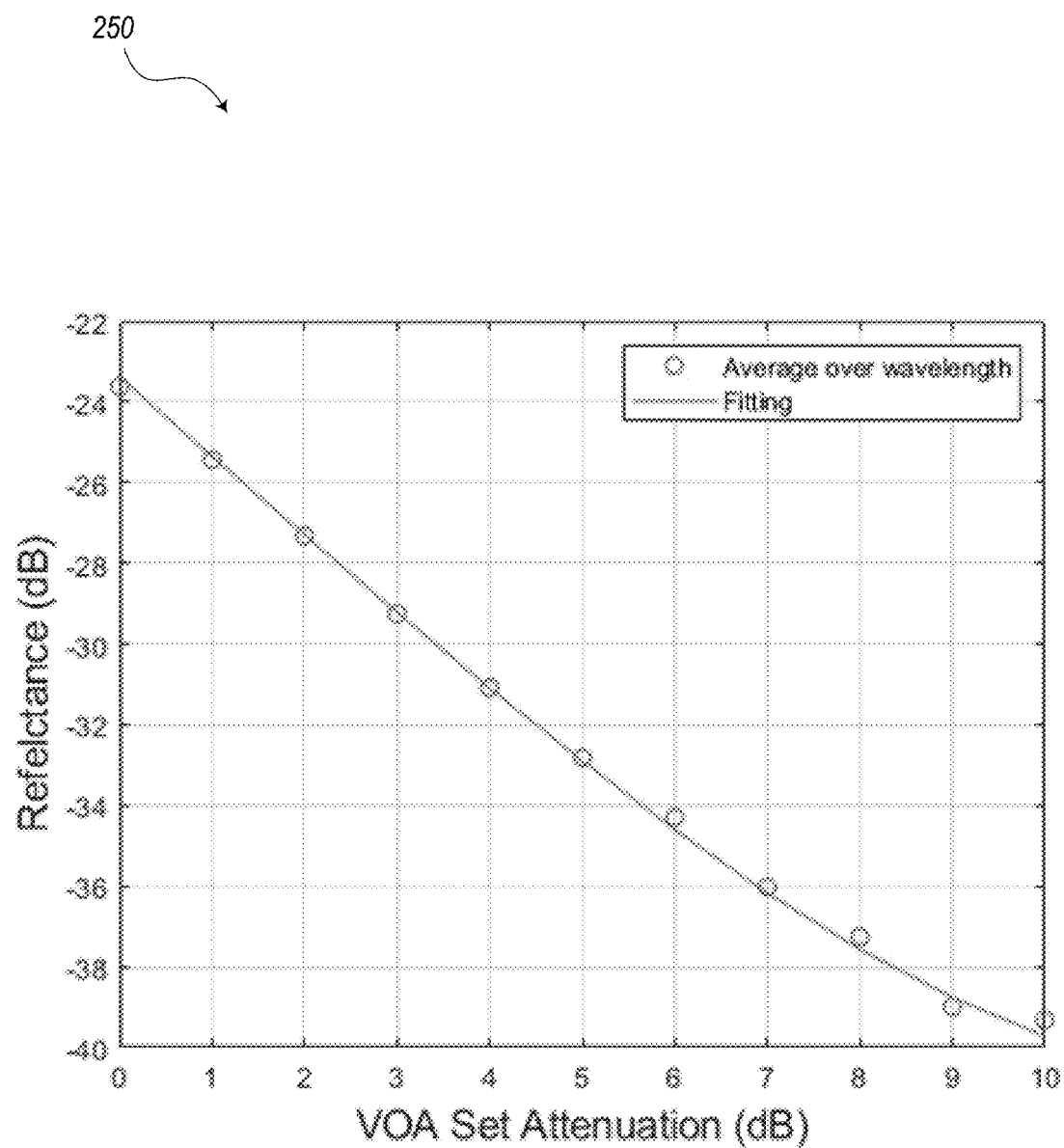
FIG. 11 is a graph showing an example of reflection (in dB) as a function of VOA attenuation (in dB), according to various embodiments.

FIG. 11 is a graph 250 showing an example of reflection (in dB) as a function of VOA attenuation (in dB). In particular, reflection may be determined by the following:

$$Y(x)=10 \log_{10}\{(\beta_1+r_1^2 x^2 R \alpha_2)\alpha_1\}$$

where x: attenuation (0.7 dB with 0 dB atten)
$r_1$: 10% tap attenuation (0.13)
$\alpha_1$: circulator loss from 1 to 2 (0.615)
$\alpha_2$: circulator loss from 2 to 3 (0.6)
R: reflectance of reflector (1)
$\beta_1$: combined tap loss and return loss of 90% tap (1e-4)

For example, reflection may be measured by a photodiode connected to receive power from the EO port 165 of the Raman amplifier 164.

Figure 12A:
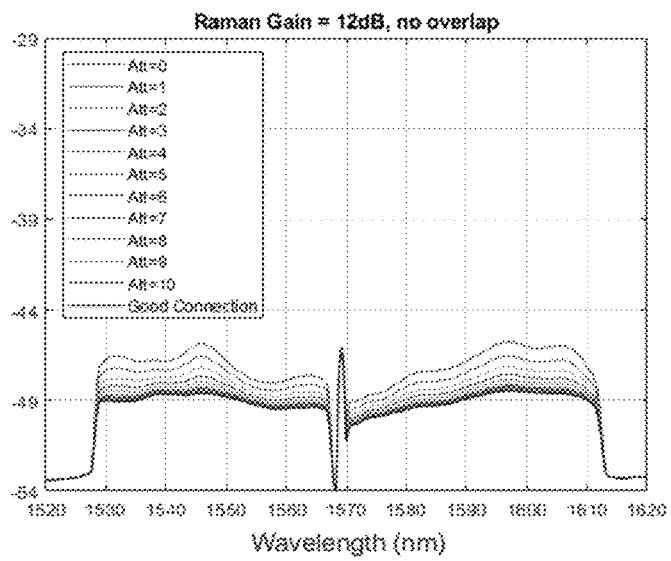
FIGS. 12A-12C are graphs showing backward ASE spectrum with different reflection, gain, and overlap, according to various embodiments.
Figure 12B:
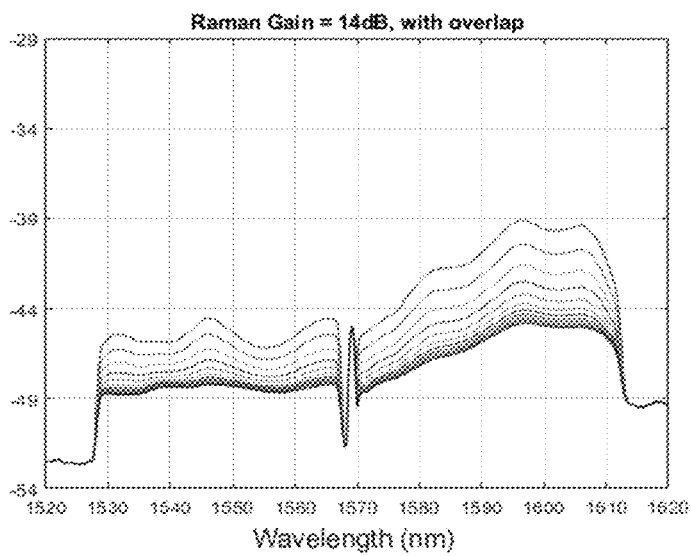
Figure 12C:
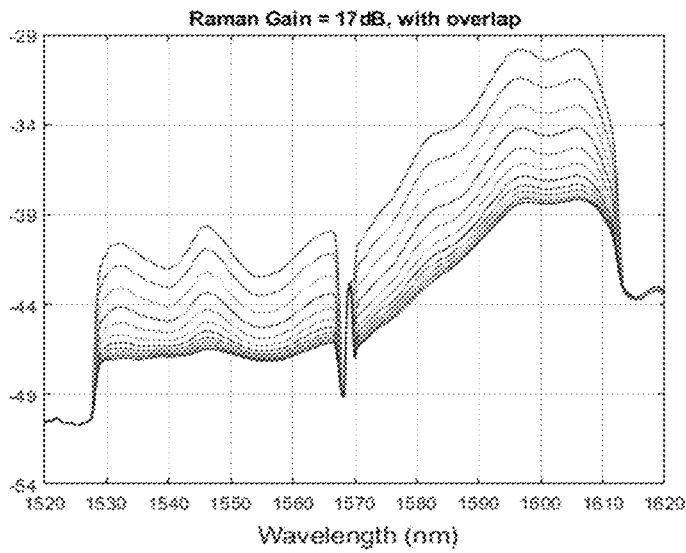

FIGS. 12A-12C are graphs showing backward ASE spectrum with different reflection, gain, and overlap. The test setup includes a good connection between the EO port 165 of the Raman amplifier 164 with a Common-In port 229 of the amplifier 228 (FIG. 8).

Figure 13:
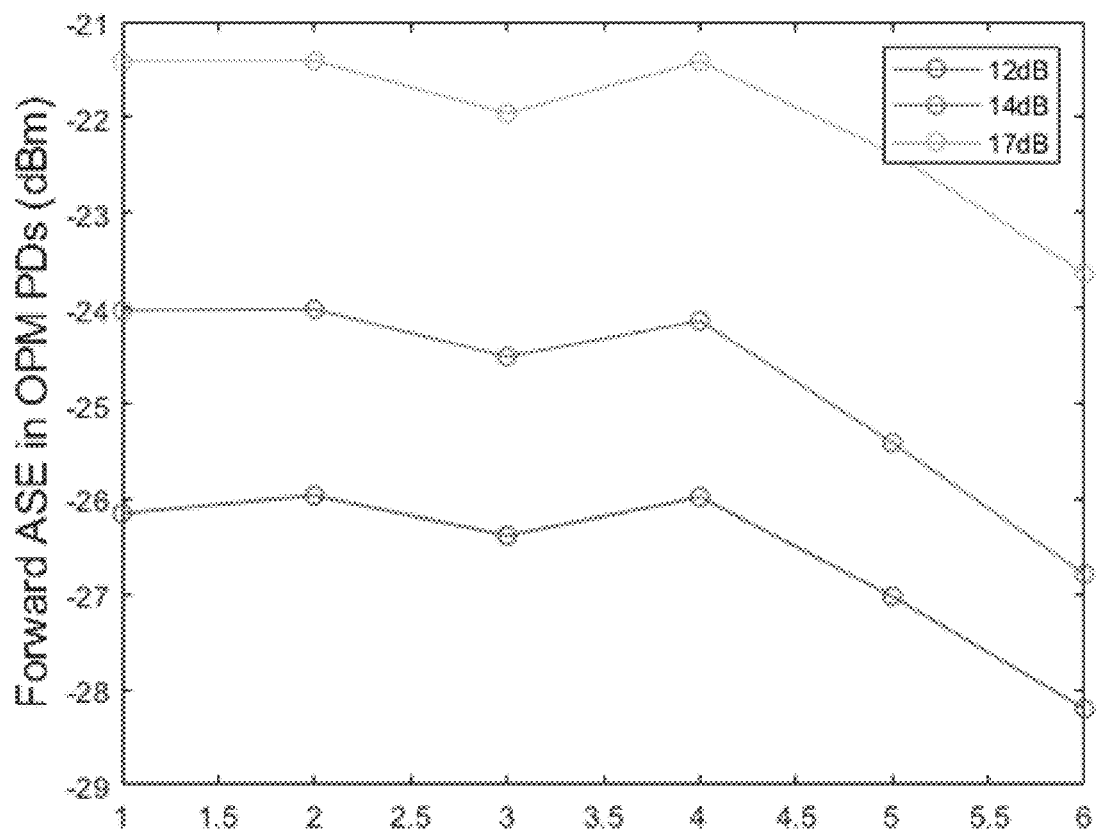
FIG. 13 is a graph showing the impact on forward ASE, according to various embodiments.

FIG. 13 is a graph showing the impact on forward ASE. In this test setup, six photodiodes were used by the OPM 234 to measure power when upstream amplifier (e.g., booster amplifier 228) was turned off. There was found to be no significant increase in forward ASE with or without overlap. Also, the forward ASE power was not significantly affected by reflection changes in the EO port 165.

Figure 14A:
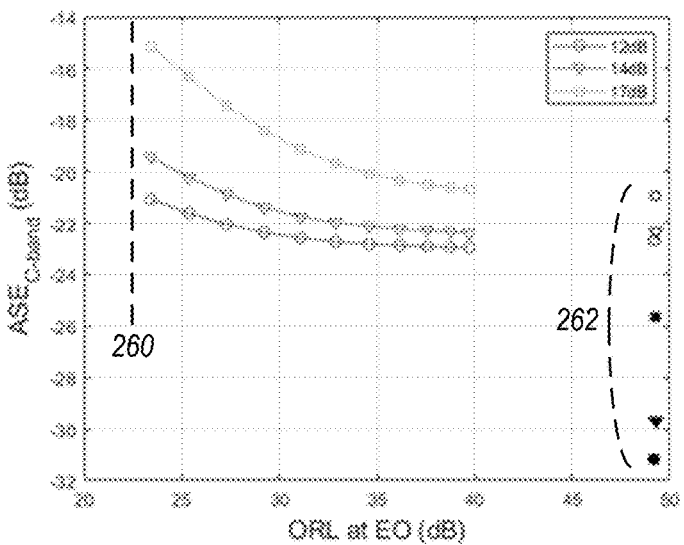
FIGS. 14A-14C are graphs showing examples of Amplified Spontaneous Emission (ASE) versus Optical Return Loss (ORL) for different bands, according to various embodiments.
Figure 14B:
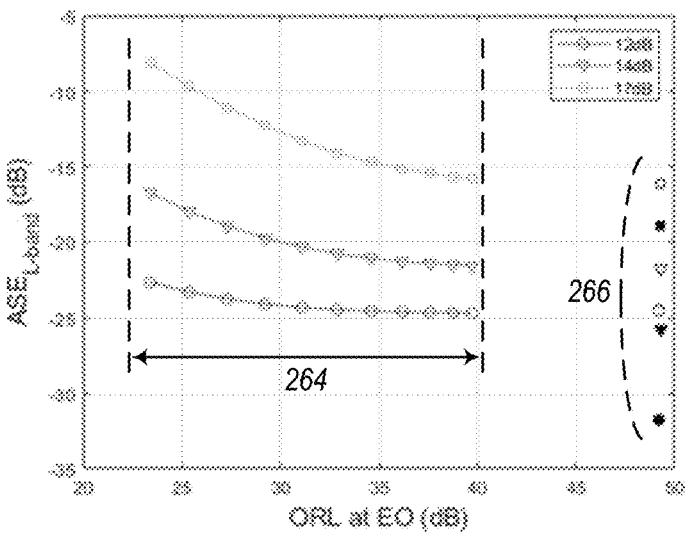
Figure 14C:
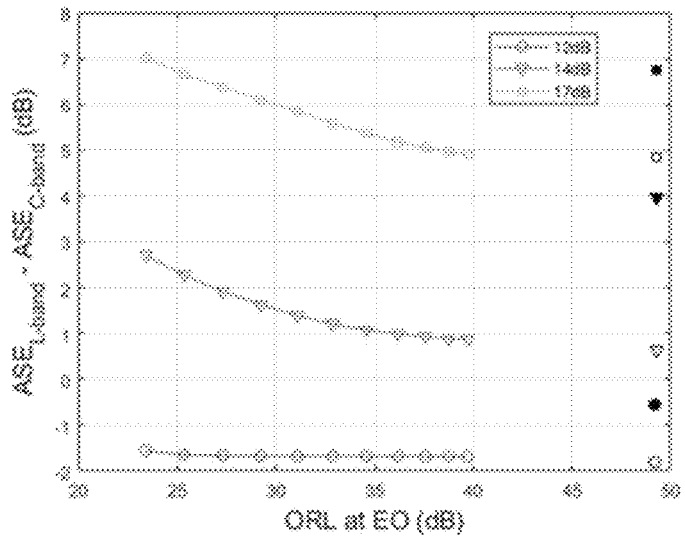

FIGS. 14A-14C are graphs showing examples of Amplified Spontaneous Emission (ASE) versus Optical Return Loss (ORL) for different bands. Particularly, the graphs show integrated backward ASE power at C-band and L-band. Offset was added after integrating spectrum measured at the OSA 214 (FIG. 8) to match the power detected by respective photodiodes (e.g., one or more C-band detecting photodiodes and one or more L-band detecting photodiodes) at the line amplifier 228. A default EO ORL threshold of 22 dB is used.

In FIG. 14A, a 22 dB threshold line 260 is shown. At this point, the ORL and high power is shut off. Points 262 show measurements from a photodiode of the line amplifier 228 (FIG. 8) without the phase rotator 21 (FIG. 9). FIG. 14B shows a range 264 of variable reflection using the VOA. Points 266 are related to reflections when the EO port is connected to the Common-In port 229 of the line amplifier 228. Open symbols are used to represent results when upstream booster amps are on, and solid symbols are used to represent results when upstream booster amps are off.

Figure 15A:
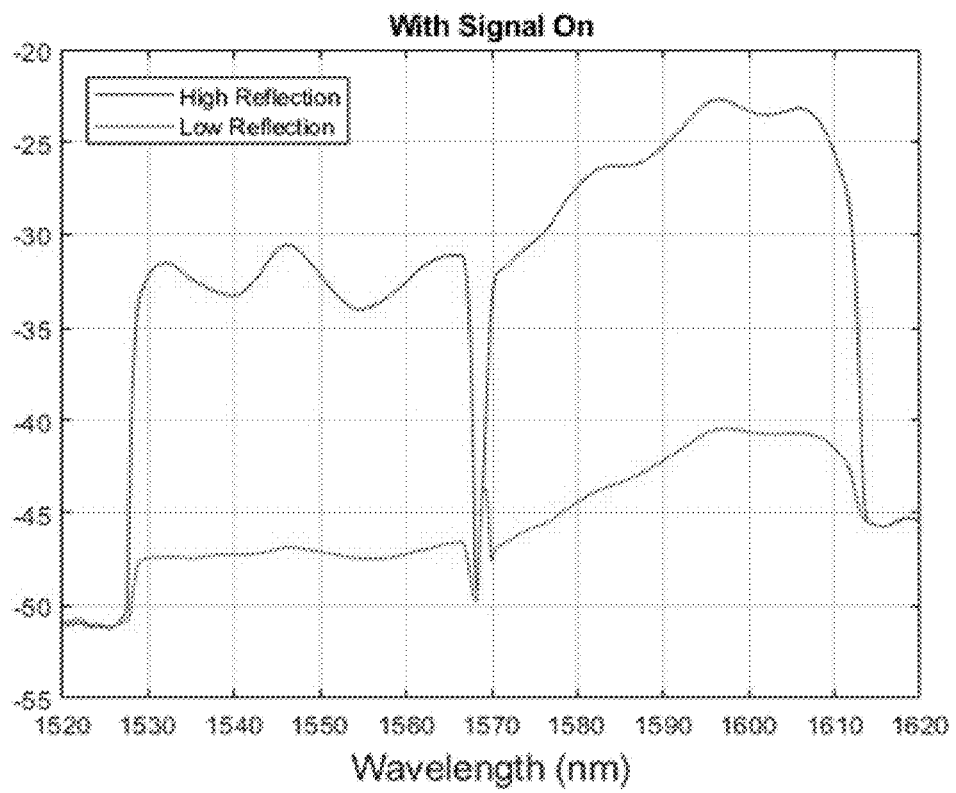
FIGS. 15A and 15B are graphs showing ASE comparisons when upstream amps are on or off, according to various embodiments.
Figure 15B:
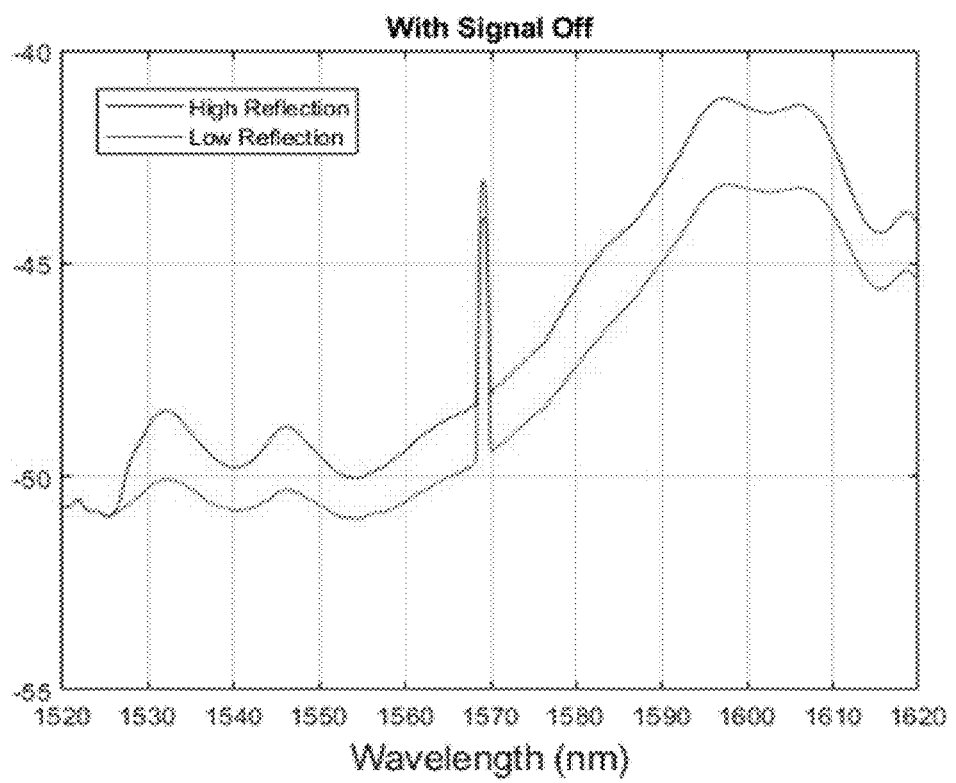

FIGS. 15A and 15B are graphs showing ASE comparisons when upstream amps are on (FIG. 15A) or off (FIG. 15B). The impact of reflection is due to the reflected signal being amplified by a co-propagating pump.

Figure 16:
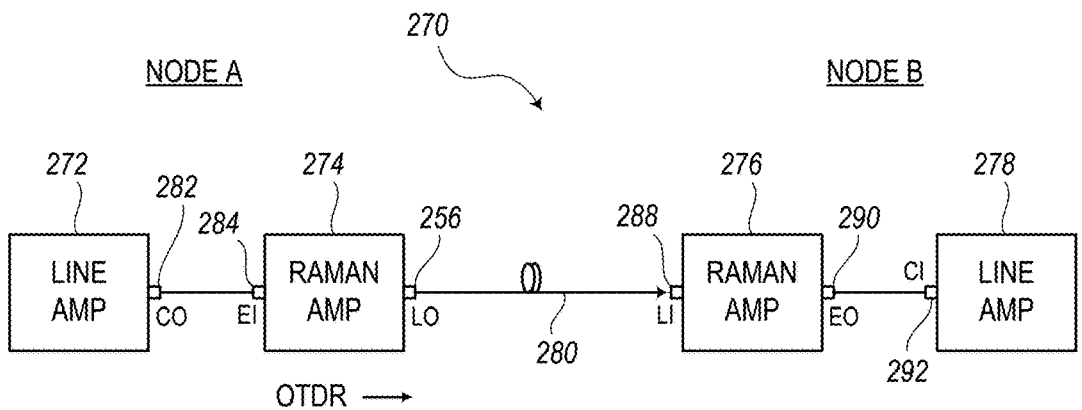
FIG. 16 shows another arrangement of an optical section that demonstrates the impact of overlap to an Optical Time-Domain Reflectometry (OTDR) trace, according to various embodiments.

FIG. 16 shows another arrangement of an optical section 270 that demonstrates the impact of overlap to an Optical Time-Domain Reflectometry (OTDR) trace. The optical section 270 in this embodiment includes a line amplifier 272 and Raman amplifier 274 at Node A connected to a Raman amplifier 276 and line amplifier 278 at Node B, where Node A and Node B are connected to each other via a fiber span 280. In some examples, the fiber span 280 may be about 80 km and may have a span loss of 23 dB. The line amplifier 272 includes a Common-Out (CO) port 282 connected to an Express-In (EI) port 284 of the Raman amplifier 274, which also includes a Line-Out (LO) port 286 connected to the fiber span 280 at the local end. The far end of the fiber span 280 is connected to a Line-In (LI) port 288 of the Raman amplifier 276. The Raman amplifier 276 also includes an Express-Out (EO) port 290 connected to a Common-In (CI) port 292 of the line amplifier 278.

Figure 17A:
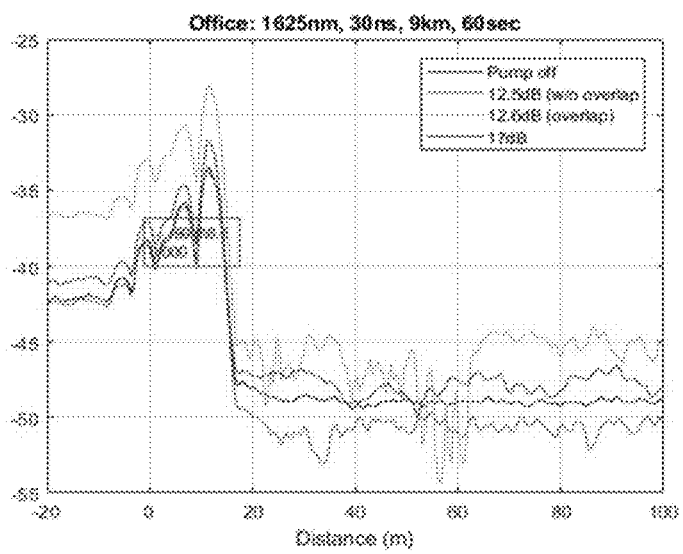
FIGS. 17A and 17B are graphs showing an example of results obtained using an OTDR trace with different Raman gain, according to various embodiments.
Figure 17B:
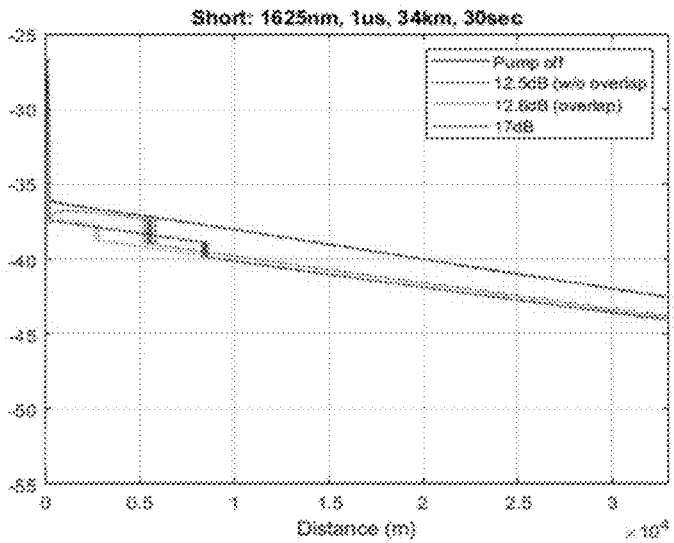

FIGS. 17A and 17B are graphs showing an example of results obtained using an OTDR trace with different Raman gain. It may be noted that OTDR traces in the Line-Out (LI) direction from the LO port 286 may be unreliable in some cases for detecting the location of back-reflection for typical APR investigation for the booster amplifier direction.

Figure 18A:
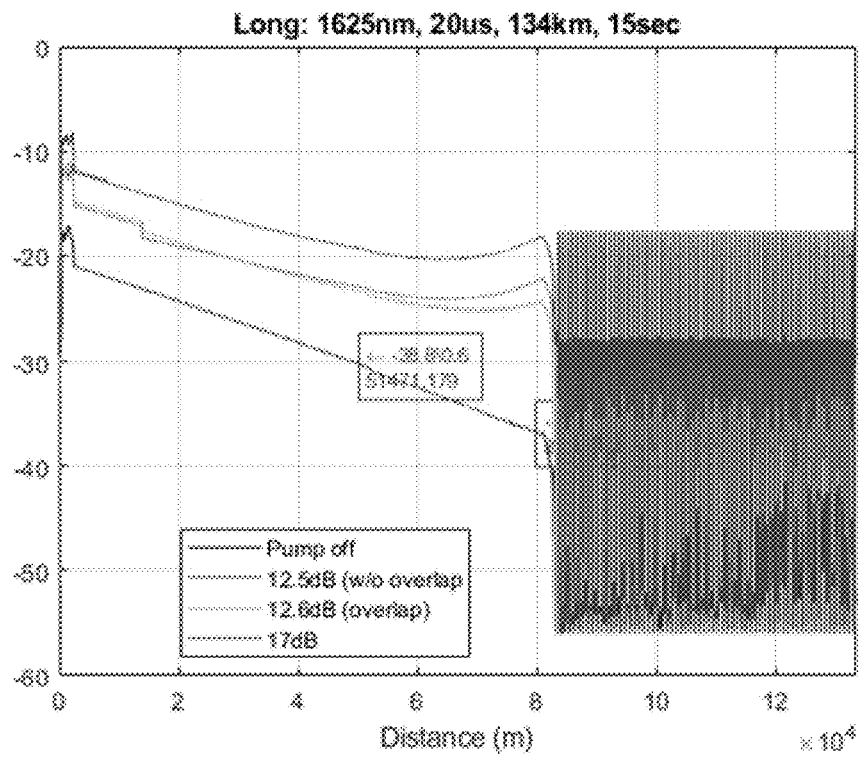
FIGS. 18A and 18B are graphs showing an example of results obtained using an OTDR trace with different Raman gain, according to various embodiments.
Figure 18B:
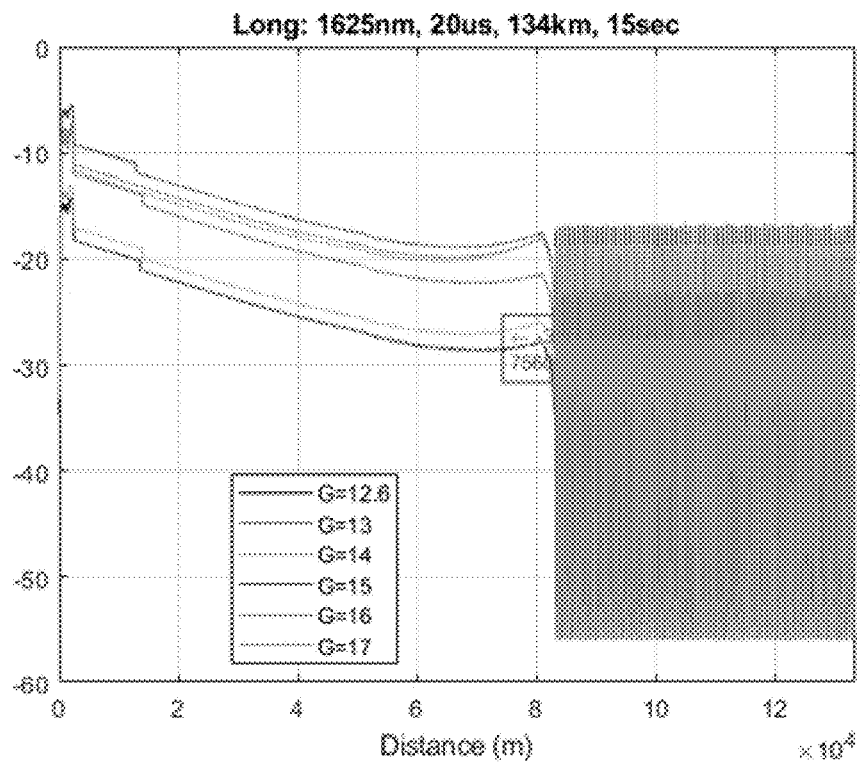
Figure 19A:
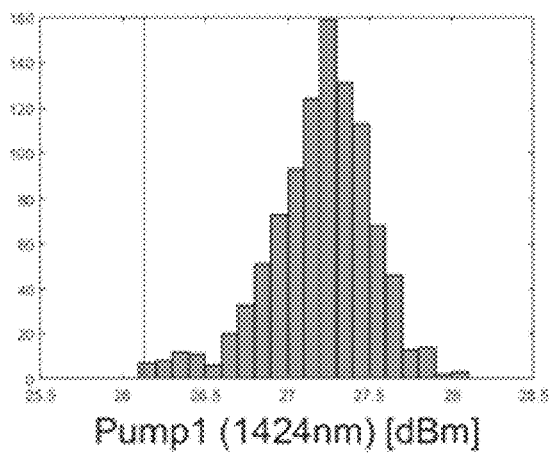
FIGS. 19A-19F are graphs showing an example of pump metrics obtained in tests, according to various embodiments.
Figure 19B:
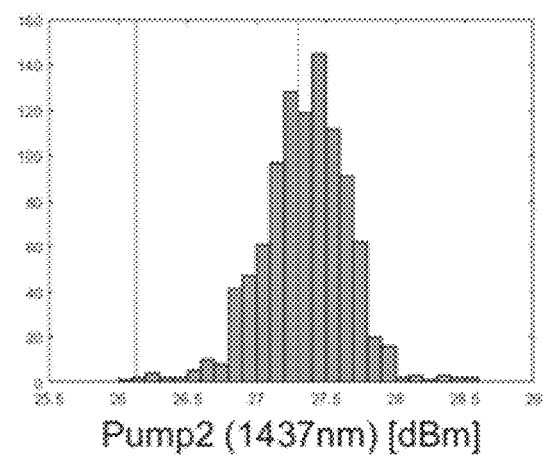
Figure 19C:
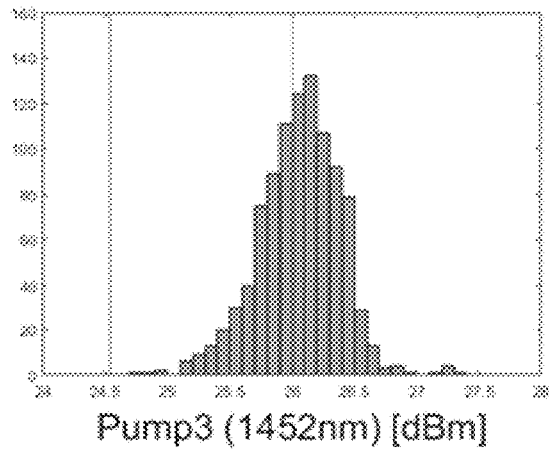
Figure 19D:
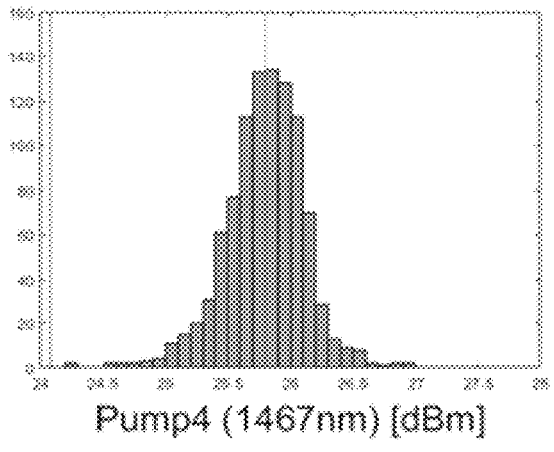
Figure 19E:
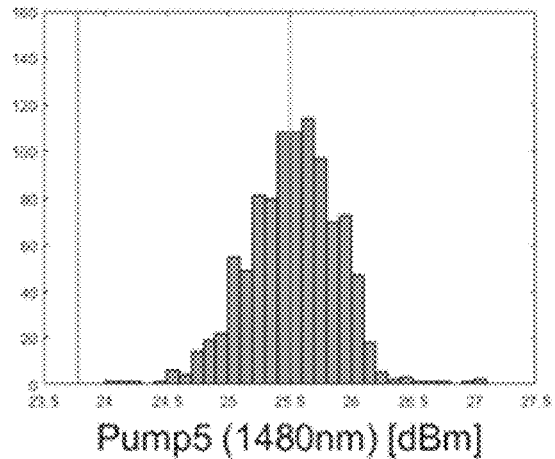
Figure 19F:
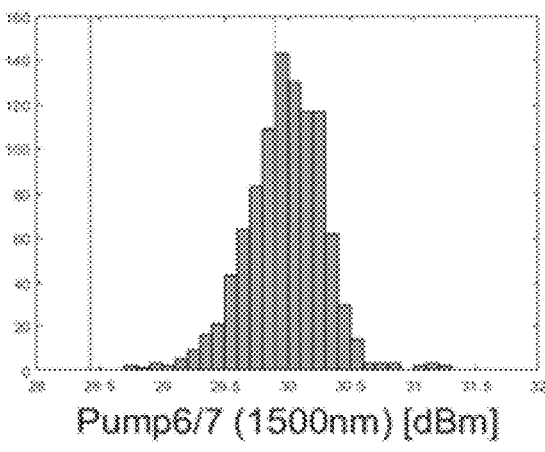

FIGS. 18A and 19B are graphs showing an example of results obtained using an OTDR trace with different Raman gain. The backward ASE in this example may be modulated by Pulse Width Modulation (PWM). This ASE may be configured to come into an OTDR receiver circuit and create ripple.

FIGS. 19A-20F are graphs showing an example of pump metrics obtained in tests. Previous analyses were assumed with worst (Red) and typical (Green) pump LD powers.

Figure 20:
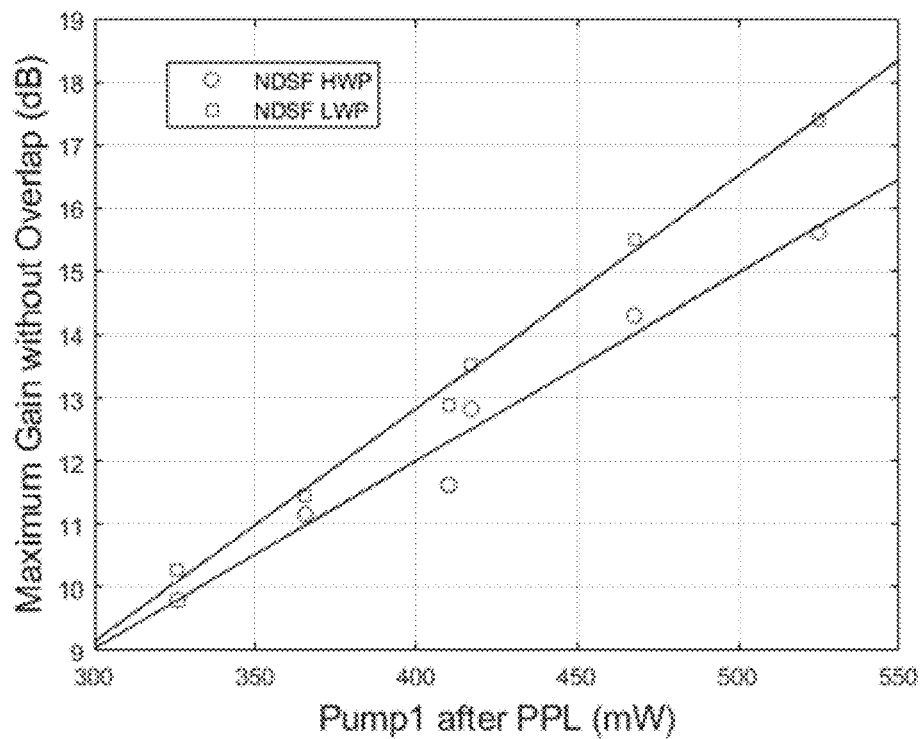
FIG. 20 shows the maximum gain without overlap (in dB) with respect to the pump after Patch Panel Loss (PPL) (in mW), according to various embodiments.
Figure 21:
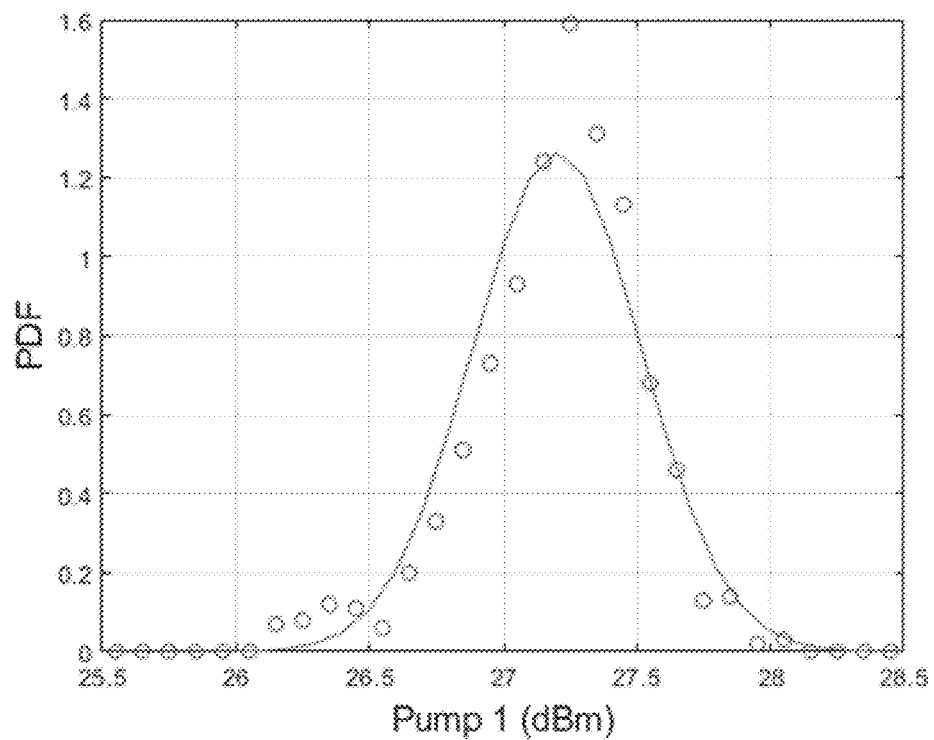
FIG. 21 shows the Probability Distribution Function (PDF) with respect to a range of losses (in dBm), according to various embodiments.

FIGS. 20 and 21 are graphs showing maximum gain calculations for Pump 1 (FIG. 19A) according to various embodiments. FIG. 20 shows the maximum gain without overlap (in dB) with respect to the pump after Patch Panel Loss (PPL) (in mW). FIG. 21 shows the Probability Distribution Function (PDF) with respect to a range of losses (in dBm).

Figure 22A:
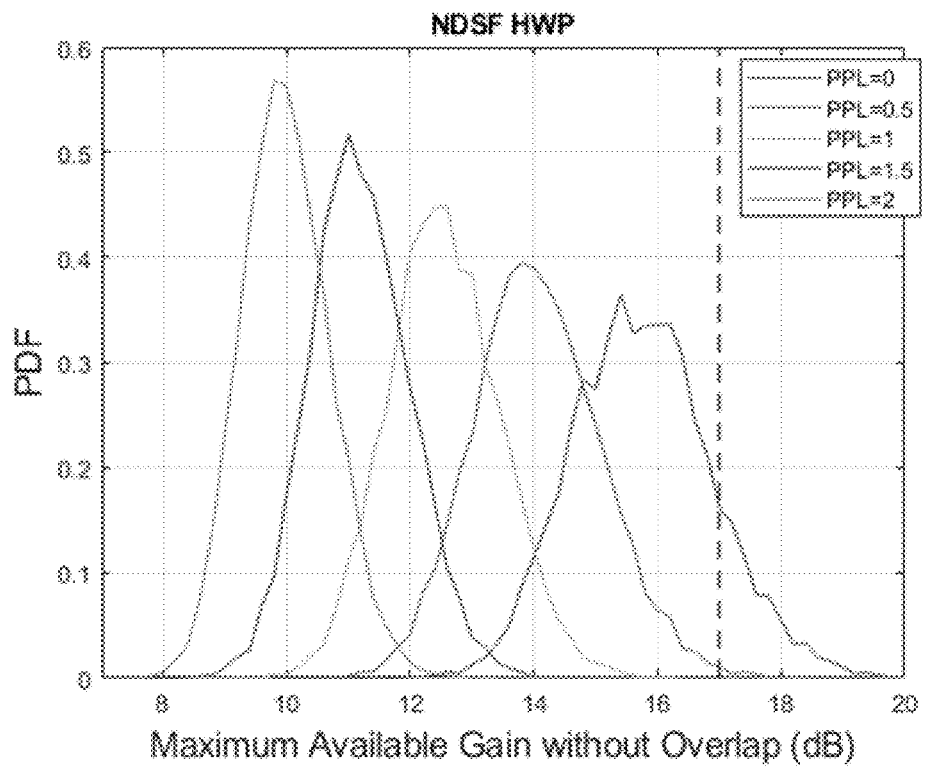
FIG. 22A is a graph showing the High Water Peak (HWP) of a Non-zero Dispersion-Shifted Fiber (NDSF), according to various embodiments.
Figure 22B:
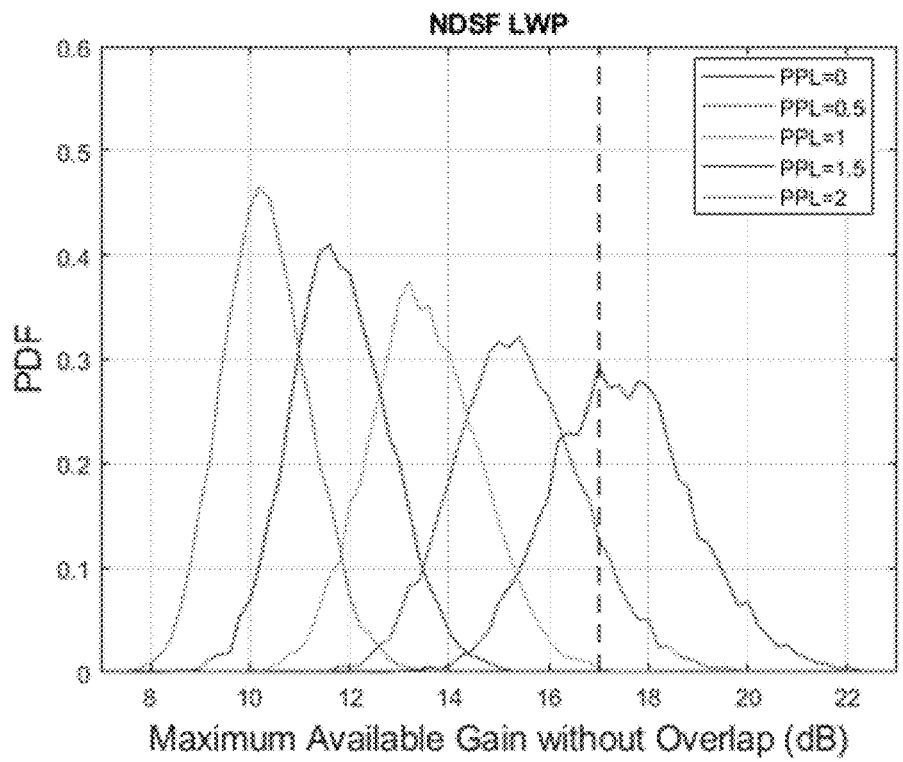
FIG. 22B is a graph showing the Low Water Peak (LWP) of the NDSF, according to various embodiments.

FIG. 22A is a graph showing the High Water Peak (HWP) of a Non-zero Dispersion-Shifted Fiber (NDSF) and FIG. 22B is a graph showing the Low Water Peak (LWP) of the NDSF. The graphs of FIGS. 22A and 22B show an example of maximum gain distribution where the PDF is measured with respect to the maximum available gain without overlap (in dB) at different fixed PPL values (i.e., PPL=0, 0.5, 1.0, 1.5, and 2.0).

Figure 23:
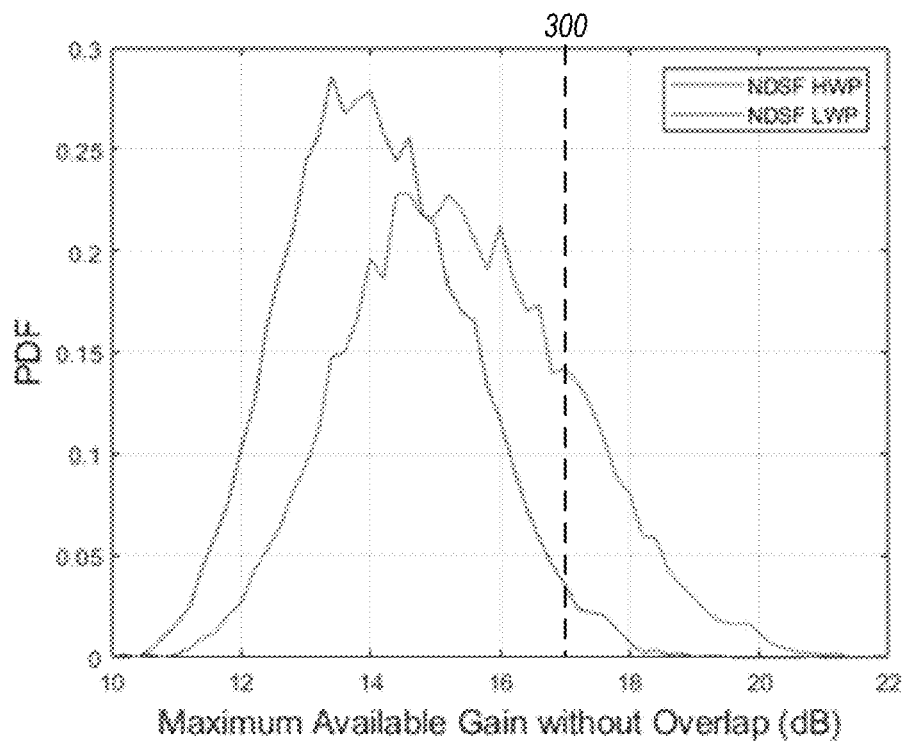
FIGS. 23 and 24 are graphs showing an example where both the pump maximum power and the Patch Panel Loss (PPL) are random, according to various embodiments.
Figure 24:
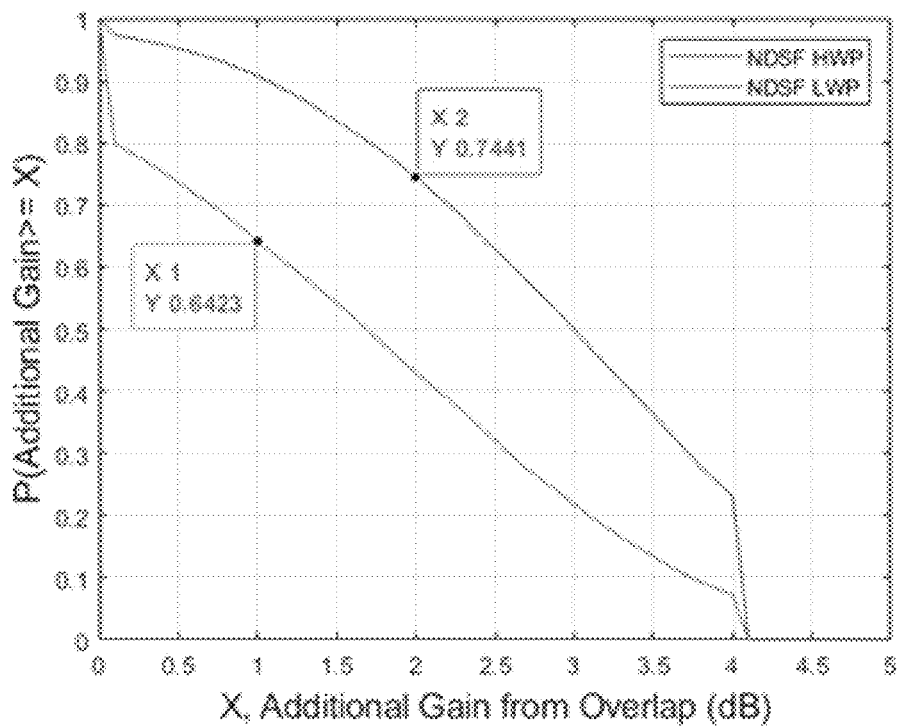

FIGS. 23 and 24 are graphs showing an example where both the pump maximum power and the Patch Panel Loss (PPL) are random. In this example, it may be assumed that Pump 1 (FIG. 19A) has a normal distribution (e.g., mean 27.2 dBm standard of 0.3158). The PPL may be uniformly distributed between 0 dB and 1 dB.

In FIG. 23, the PDF is measured with respect to maximum available gain without overlap. As shown at line 300, a clamping condition is indicated. When the power has a maximum gain of 17 dB, the HWP may be at 1.94% and the LWP may be at 18.4%. In FIG. 24, the graph shows the probability that additional gain would be greater than or equal to X, where X is the additional gain from overlap (in dB). With X=1, Y is found to be 0.6423, whereby the probability in this case is that at least 1 dB more gain can be achieved with overlap, which means a 64% probability. When X=2, Y is found to be 0.7441, whereby the probability in this case is that at least 2 dB more gain can be achieved with overlap, which means a 74% probability.

Figure 25:
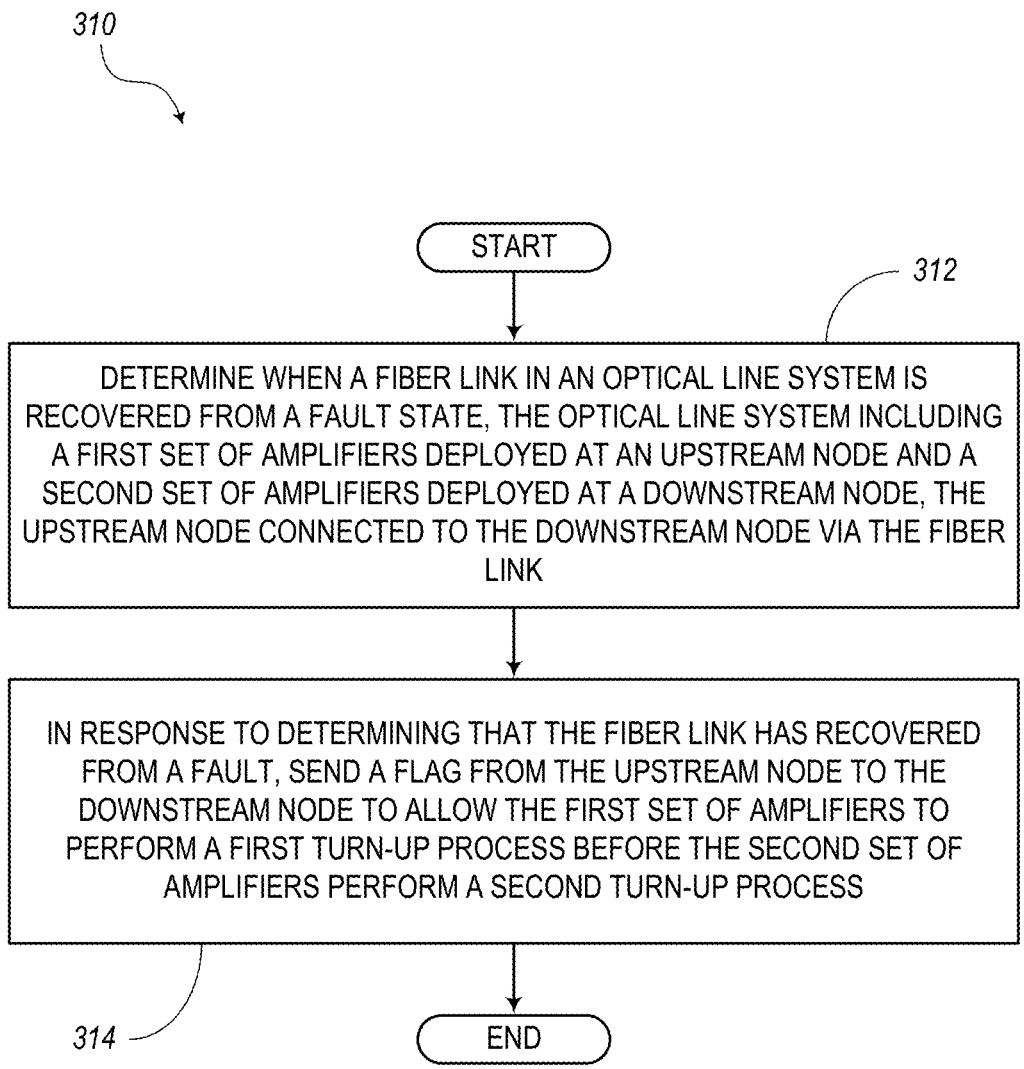
FIG. 25 is a flow diagram illustrating an embodiment of a process 310 of creating a sequence of turn-up procedures for amplifiers in an optical network, according to various embodiments.

FIG. 25 is a flow diagram illustrating an embodiment of a process 310 of creating a sequence of turn-up procedures for amplifiers in an optical network. In the illustrated embodiment, the process 310 includes determining (block 312) when a fiber link in an optical line system is recovered from a fault state, the optical line system including a first set of amplifiers deployed at an upstream node and a second set of amplifiers deployed at a downstream node, the upstream node connected to the downstream node via the fiber span. The process 310 also includes, in response to determining that the fiber link has recovered from a fault, sending (block 314) a flag from the upstream node to the downstream node to allow the first set of amplifiers to perform a first turn-up process before the second set of amplifiers perform a second turn-up process. In some embodiments, the process 310 may be performed by the supervisory system 10 of FIG. 1 and may include instructions embedded in the automatic turn-up unit 24.

According to some embodiments, the first set of amplifiers may include at least an Erbium-Doped Fiber Amplifier (EDFA). The first turn-up process may be configured to move the EDFA from an Automatic Power Reduction (APR) condition to a target output power condition. Also, the second set of amplifiers may include at least a Raman amplifier. Before receiving the flag, the Raman amplifier may be liable to counter-propagate Amplified Spontaneous Emission (ASE) to the upstream node potentially causing the first set of amplifiers at the upstream node to go into an Automatic Power Reduction (APR) condition.

Furthermore, the process 310 may be defined whereby the flag is a Forward Defect Indicator (FDI) configured to keep the second set of amplifiers from turning on. After the first set of amplifiers performs the first turn-up process, the process 310 may include clearing the flag to allow the second set of amplifiers to perform the second turn-up process. The step of clearing the flag may be performed by a) using an amplifier card turn-up diagnostic point to confirm that the card is ready to carry traffic and/or b) clearing a Loss of Signal (LOS) indication from an immediate downstream Express-In (EI) port of a Raman amplifier of the first set of amplifiers.

In some embodiments, the process 310 may also include performing an Automatic Laser Shut-Off (ALSO) process before sending the flag from the upstream node to the downstream node. The ALSO process may be configured to shut off the lasers of the first set of amplifiers at the upstream node and the second set of amplifiers at the downstream node. The process 310 may also include performing the first turn-up process to move at least one amplifier of the first set of amplifiers to a targeted power regardless of an Automatic Power Reduction (APR) condition or low Optical Return Loss (ORL) condition. According to some embodiments, the process 310 may include detecting when there is a fiber disconnection condition and then reducing power to reduce the risk of eye damage to a person near the first set of amplifiers.

Therefore, the present disclosure provides systems and methods for deriving coordination sequences for amplifier turn-up between local EDFA and remote Raman amplifier by sending a flag from the local EDFA to remote Raman. This allows the local EDFA to turn up first before the remote Raman, which is configured to avoid turn-up interruptions of the local EDFA due to backward ASE from the remote Raman. Also, the present disclosure provides embodiments of systems and methods for deriving sequences that a remote device (e.g., a Raman amplifier) can handle on its own without any link dependency to associated local EDFAs or supervisory systems. This can be done by the remote device detecting its own Express-In (EI) port for Loss of Signal (LOS) and sending a flag to downstream amplifiers. With automated turn-up processes described herein, the device level implementations allow for a fast recovery.

There are various benefits that can be attained as a result of deployment of the various embodiments of the present disclosure. In a C+L-band system in an optical line section, some C+L solutions have superior performance with higher Raman amplification. The present embodiments are operable in such system and are able to reduce Four-Wave Mixing (FWM) effects compared to other conventional solutions.

The present disclosure addresses the issues with respect to EDFA turn-up in a Raman amplified fiber span. It is anticipated that with increased network deployment activities, the present solution can be found increasingly on more occasions. Also, these solutions can ease off network deployments and provide for recovery from power-cycles or fiber-cuts.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A supervisory system comprising:
   a processing device, and
   a memory device configured to store a computer program having instructions that, when executed, enable the processing device to
   determine when a fiber link in an optical line system is recovered from a fault state, the optical line system including a first set of amplifiers deployed at an upstream node and a second set of amplifiers deployed at a downstream node, the upstream node connected to the downstream node via the fiber link,
   in response to determining that the fiber link has recovered from a fault based on communication between the upstream node and the downstream node, set a flag at the upstream node, wherein the flag is configured to allow the first set of amplifiers to perform a first turn-up process before the second set of amplifiers perform a second turn-up process such that the set flag at the upstream node prevents the second turn-up process, and subsequent to the first turn-up process including an Optical Time-Domain Reflectometry (OTDR) trace to determine a condition of the fiber link, clear the flag at the upstream node, to allow the second turn-up process.

2. The supervisory system of claim 1, wherein the first set of amplifiers includes at least an Erbium-Doped Fiber Amplifier (EDFA).

3. The supervisory system of claim 2, wherein the first turn-up process is configured to move the EDFA from an Automatic Power Reduction (APR) condition to a target output power condition.

4. The supervisory system of claim 1, wherein the second set of amplifiers includes at least a Raman amplifier.

5. The supervisory system of claim 4, wherein, before the flag is cleared, the Raman amplifier is liable to counter-propagate Amplified Spontaneous Emission (ASE) to the upstream node.

6. The supervisory system of claim 1, wherein the flag is a Forward Defect Indicator (FDI) configured to keep the second set of amplifiers from turning on.

7. The supervisory system of claim 1, wherein the instructions further enable the processing device to clear the flag by one or more of using an amplifier card turn-up diagnostic point to confirm that the card is ready to carry traffic and clearing a Loss of Signal (LOS) indication from an immediate downstream Express-In (EI) port of a Raman amplifier of the first set of amplifiers.

8. The supervisory system of claim 1, wherein the instructions further enable the processing device to perform clearing an Automatic Laser Shut-Off (ALSO) process before the flag is cleared, the ALSO process configured to shut off lasers of the first set of amplifiers at the upstream node and the second set of amplifiers at the downstream node.

9. The supervisory system of claim 1, wherein the instructions enable the processing device to detect no fiber disconnection condition between a first set of amplifiers and a second set of amplifiers and to perform the first turn-up process to move at least one amplifier of the first set of amplifiers to a targeted power regardless of an Automatic Power Reduction (APR) condition or low Optical Return Loss (ORL) condition.

10. The supervisory system of claim 1, wherein the instructions enable the processing device to detect for a fiber disconnection condition and reduce power to mitigate the risk of fiber-connector damage or eye damage to a person near the first set of amplifiers.

11. The supervisory system of claim 1, wherein recovery from fault includes installation of the fiber link in an optical line system or recovery from a fiber-cut or power-cycles or card-replacements in an upstream or in downstream node.

12. The supervisory system of claim 1, wherein the instructions enable the processing device to detect a fiber disconnection condition between a first set of amplifiers and a second set of amplifiers and to provide an Automatic Power Reduction (APR) condition or low Optical Return Loss (ORL) condition.

13. The supervisory system of claim 1, wherein the flag is cleared responsive to completion of the first turn-up process and the OTDR trace determining no issues including low and reflection in a counter direction.

14. A non-transitory computer-readable medium configured to store computer logic having instructions that, when executed, cause one or more processing devices to:

determine when a fiber span is installed in an optical line system or when an Optical Line Failure (OLF) condition in the fiber span has recovered, the optical line system including a first set of amplifiers deployed at an upstream node and a second set of amplifiers deployed at a downstream node, the upstream node connected to the downstream node via the fiber span, in response to determining that the fiber span is initially installed in the optical line system or that an OLF in the fiber span has recovered, based on communication between the upstream node and the downstream node, set a flag at the upstream node, wherein the flag is configured to allow the first set of amplifiers to perform a first turn-up process before the second set of amplifiers perform a second turn-up process such that the set flag at the upstream node prevents the second turn-up process, and subsequent to the first turn-up process including an Optical Time-Domain Reflectometry (OTDR) trace to determine a condition of the fiber link, clear the flag at the upstream node, to allow the second turn-up process.

15. The non-transitory computer-readable medium of claim 14, wherein the first set of amplifiers includes at least an Erbium-Doped Fiber Amplifier (EDFA), and wherein the first turn-up process is configured to move the EDFA from an Automatic Power Reduction (APR) condition to a target output power condition.

16. The non-transitory computer-readable medium of claim 14, wherein the second set of amplifiers includes at least a Raman amplifier, and wherein, before the flag is cleared, the Raman amplifier is liable to counter-propagate Amplified Spontaneous Emission (ASE) to the upstream node causing the first set of amplifiers at the upstream node to go into an Automatic Power Reduction (APR) condition.

17. The non-transitory computer-readable medium of claim 14, wherein the flag is a Forward Defect Indicator (FDI) configured to keep the second set of amplifiers from turning on.

18. The non-transitory computer-readable medium of claim 14, wherein the flag is cleared by one or more of
using an amplifier card turn-up diagnostic point to confirm that the card is ready to carry traffic, and
clearing a Loss of Signal (LOS) indication from an immediate downstream Express-In (EI) port of a Raman amplifier of the first set of amplifiers.

19. A method comprising the steps of:
determining when a fiber span is installed in an optical line system or when an Optical Line Failure (OLF) condition in the fiber span has recovered based on communication between an upstream node and a downstream node, the optical line system including a first set of amplifiers deployed at the upstream node and a second set of amplifiers deployed at the downstream node, the upstream node connected to the downstream node via the fiber span, in response to determining that the fiber span is installed in the optical line system or that an OLF in the fiber span has recovered, based on communication between the upstream node and the downstream node, setting a flag at the upstream node to allow the first set of amplifiers to perform a first turn-up process before the second set of amplifiers perform a second turn-up process such that the set flag at the upstream node prevents the second turn-up process, and subsequent to the first turn-up process including an Optical Time-Domain Reflectometry (OTDR) trace to determine a condition of the fiber link, clear the flag at the upstream node, to allow the second turn-up process.

20. The method of claim 19, wherein the first set of amplifiers includes at least an Erbium-Doped Fiber Amplifier (EDFA), wherein the first turn-up process is configured to move the EDFA from an Automatic Power Reduction (APR) condition to a target output power condition, wherein the second set of amplifiers includes at least a Raman amplifier liable to counter-propagate Amplified Spontaneous Emission (ASE) to the upstream node causing the first set of amplifiers at the upstream node to go into the APR condition.

\* \* \* \* \*